US012783952B2

(12) United States Patent
Ren et al.

(10) Patent No.: US 12,783,952 B2
(45) Date of Patent: Nov. 3, 2026

(54) TWO TOWER NETWORK EXTENSION FOR JOINTLY OPTIMIZING MULTIPLE DIFFERENT TYPES OF RECOMMENDATIONS

(71) Applicant: Microsoft Technology Licensing, LLC, Redmond, WA (US)

(72) Inventors: Zhiyun Ren, Cupertino, CA (US); Padmini Jaikumar, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 690 days.

(21) Appl. No.: 18/343,496

(22) Filed: Jun. 28, 2023

(65) Prior Publication Data

US 2025/0005440 A1 Jan. 2, 2025

(51) Int. Cl.
*G06N 20/00* (2019.01)

(52) U.S. Cl.
CPC .................................... *G06N 20/00* (2019.01)

(58) Field of Classification Search
CPC ............................... G06N 20/00; G06N 3/045
See application file for complete search history.

(56) References Cited

U.S. PATENT DOCUMENTS

| | | | | |
|---|---|---|---|---|
| 2016/0191450 | A1* | 6/2016 | Lineberger | G06Q 10/40 709/206 |
| 2019/0188561 | A1* | 6/2019 | Tang | G06F 16/9535 |
| 2019/0303835 | A1* | 10/2019 | Saha | G06F 16/9035 |
| 2021/0192460 | A1* | 6/2021 | Xu | G06Q 10/1053 |
| 2022/0058489 | A1* | 2/2022 | Volkovs | G06N 3/0499 |
| 2022/0245158 | A1* | 8/2022 | Kehal | G06F 16/24578 |
| 2022/0358366 | A1* | 11/2022 | Lee | G06N 3/045 |
| 2023/0401464 | A1* | 12/2023 | Fan | G06F 16/735 |
| 2024/0380822 | A1* | 11/2024 | Wang | G06F 16/71 |

* cited by examiner

*Primary Examiner* — Dave Misir
(74) *Attorney, Agent, or Firm* — NICHOLSON DE VOS WEBSTER & ELLIOTT LLP

(57) ABSTRACT

An extended two tower network is used to make both a recommendation of a content item that a given user may be interested in, and a recommendation of a user that may be interested in a given content item. The extended two tower network includes a content item sub-tower, a user sub-tower, and a fusion sub-model that are jointly trained to predict a probability that a given user is interested in a given content item. The content item sub-tower and the user sub-tower are used to make an initial prediction that the given user will be interested in the given content item. The initial prediction is then input to the fusion sub-model to make a final prediction. In the case of a candidate invitee recommendation, the initial prediction may be combined with one or more interaction features and the combination input to the fusion sub-model to make the final prediction.

20 Claims, 10 Drawing Sheets

TWO TOWER NETWORK EXTENSION FOR JOINTLY OPTIMIZING MULTIPLE DIFFERENT TYPES OF RECOMMENDATIONS

TECHNICAL FIELD

A technical field to which the present disclosure relates is machine learning.

BACKGROUND

A two tower network is a type of machine learning model that can be used to process two different types of input data. The output of two tower networks can be used by recommendation systems.

BRIEF DESCRIPTION OF THE DRAWINGS

The disclosure will be more fully understood from the detailed description provided below and the accompanying drawings depicting various embodiments of the disclosure. The drawings are intended for explanation and understanding purposes only and should not be interpreted as limiting the disclosure to the specific embodiments shown.

DETAILED DESCRIPTION

Figure 1:
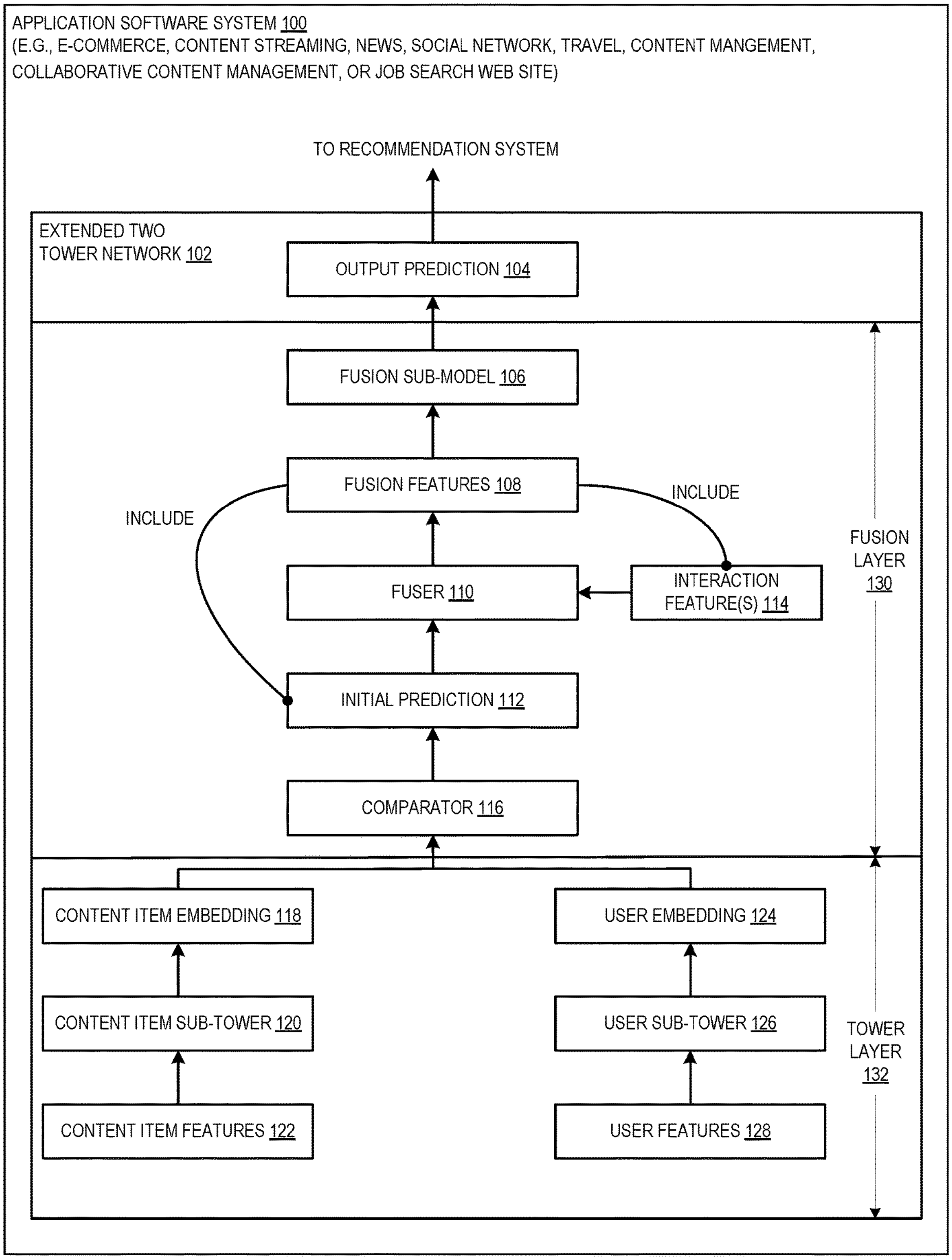
FIG. 1 illustrates an application software system that encompasses an extended two tower network, according to some embodiments.

Recommendation systems machine-generate recommendations that can be presented to users of application software systems. The relevance of these machine-generated recommendations is vitally important for the success of recommendation systems, as success is often measured by user responses to the recommendations. The designers of recommendation systems cannot know in advance which recommendations will be successful. Therefore, accurate prediction of recommendation relevance is necessary. In addition to accurate prediction, there is a need for scalability, especially when generating and presenting recommendations to users of large-scale application software systems in real time.

The methods and systems (collectively referred to as "techniques") described herein address the need for both relevant recommendations and scalability in the recommendation process. These techniques involve an extended two-tower network used for two purposes: (1) recommending content items that a particular user may be interested in (content item recommendation), and (2) recommending users who may be interested in a specific content item (candidate invitee recommendation).

In some embodiments, the extended two tower network includes a content item sub-model, a user sub-model, and a fusion sub-model that are jointly trained to predict a probability that a given user is interested in a given content item. For both a content item recommendation and a candidate invitee recommendation, the outputs of the content item sub-model and the user sub-model are used to make an initial prediction that the given user will be interested in the given content item. For a content item recommendation, at least the initial prediction is input to the fusion sub-model to make an output prediction. For a candidate invitee recommendation, the initial prediction may be combined with one or more "interaction" features. In some embodiments, an interaction feature represents a strength of association between the given user and one or more users, content items, or other entities associated with the given content item. The initial prediction combined with the interaction feature(s) are input to the fusion sub-model to make an output prediction. In either case, the output prediction is provided a recommendation system to make the candidate invitee recommendation or the content item recommendation.

To illustrate the problem addressed in this context, let's consider event and invitee recommendations in a web-based social network. This social network facilitates the promotion of in-person and web-based events attended by its members. Given the large number of members and events within the network, it is crucial to recommend events that are likely to be attended by the members. To determine which events to recommend to specific members, the social network employs a two-tower network. The event tower models events, while the member tower models the network's members. These towers generate embeddings for individual events and members, which can be compared to assess the likelihood of a member attending a particular event.

Building on the previous example, in addition to recommending events to members, the social network provides the capability for members associated with an event (such as sponsors, creators, or attendees) to invite other members to attend. When an associated member invites another member to an event, the social network may send an electronic invitation or notification (such as an email, feed notification, etc.) to the recipient, inviting them to attend the event. It is essential for the social network to recommend potential invitees to the associated member who are likely to accept the invitation. Numerous members could be suggested as potential invitees, and making relevant invitee recommendations is crucial not only for increasing member engagement with the social network but also for the associated member, who can potentially boost event attendance by sending invitations to members likely to accept. Recommending members as invitees who are unlikely to accept an invitation may result in low event attendance, while there may be other members who are more likely to accept an invitation.

The techniques described herein offer more relevant recommendations for invitees by extending the two-tower network used for event recommendations. Moreover, as mentioned earlier, these techniques are applicable not only to event and invitee recommendations but also to a wide range of content item recommendations. This includes events, files, articles, images, videos, products, music, podcasts, movies, TV shows, songs, playlists, posts, pages, accounts, flights, hotels, jobs, and more. Similarly, the techniques can be used for candidate invitee recommendations, such as recommending users on e-commerce, content streaming, news, social media, travel, or job search websites, among others. Recommendations can be delivered through various channels, including email messages, text messages, push notifications, pop-up windows, or content displayed within a specific area or widget in a program or on a web page.

The techniques presented here employ an extended two-tower approach. In this approach, a base two-tower sub-network is utilized to predict the probability of user interest in content items using input data that represents both the users and the content items. To enhance the base two-tower sub-network, a fusion sub-model is incorporated, resulting in an extended two-tower network. This extended network has the capability to simultaneously and accurately predict two aspects: (1) the likelihood of user interest in content items based on input data representing users and content items alone, and (2) the likelihood of user interest in content items considering additional contextual information, including one or more "interaction" features.

As mentioned, in some embodiments, each interaction feature represents a strength of association between a given user and one or more users, content items, or other entities associated with a given content item. The base two tower sub-network is extended with the fusion sub-model such that the interaction feature(s) do not need to be incorporated into the input data to the user tower and the content item tower of the base two tower network. Instead, the interaction feature(s) can be combined with an output of the base two tower sub-network and the combination input to the fusion sub-model that makes the predictions. By doing so, embeddings representing users generated by the user sub-tower or embeddings representing content items generated by the content item sub-tower can be pre-generated prior to a request to make a prediction for a given content item and a given user, thereby decreasing the latency and increasing the throughput of predictions made by the extended two tower network in response to requests to make those predictions.

The techniques include obtaining a content item embedding generated by the content item sub-tower representing the given content item and a user embedding generated by the user sub-tower representing the given user. The content item embedding is compared to the user embedding (e.g., by a sigmoid function applied to a dot product of the embeddings, a cosine distance between the embeddings, a Euclidean distance between the embeddings, etc.) to obtain an initial prediction representing an initial probability that the given user is interested in the given content item. The initial prediction is combined with one or more interaction features each representing a strength of association between the given user and one or more users, content items, or other entities associated with the given content item. The combination is input to the fusion sub-model which produces an output prediction representing a final probability that the given user will be interested in the given content item. A determination of whether to recommend the given user is made based on the output prediction.

The techniques may jointly train the content item sub-tower, the user sub-tower, and the fusion sub-model so that the extended two tower network generalizes well for making both content item recommendations where interaction features are not used to make predictions and candidate invitee recommendations where interaction features are used to make predictions. While in some embodiments interaction feature(s) are not used for making content item recommendations, interaction feature(s) are used for making content item recommendation in other embodiments.

Example Application Software System

FIG. 1 illustrates an application software system 100 that encompasses extended two tower network 102, according to some embodiments. Application software system 100 can be a large-scale website with many users and managing many content items such as, for example, a website or a set of websites encompassing any or all of the following types of websites: events, e-commence, content streaming, news, social networking, travel, content management, collaborative content management, job search, employment recruiting, etc.

In summary, an output of extended two tower network 102 in an inference mode of operation is output prediction 104 which is provided to a recommendation system in system 100. Output prediction 104 is output by fusion sub-model 106 based on one or more fusion features 108 which are input to fusion sub-model 106. Fusion features 108 are generated by fuser 110. In the case of a candidate invitee recommendation, fusion features 108 generated by fuser 110 include initial prediction 112 and one or more interaction features 114. In the case of a content item recommendation, fusion features 108 generated by fuser 110 include initial prediction 112 but do not necessarily include interaction feature(s) 114. Initial prediction 112 is generated by comparator 116 which generates initial prediction 112 by comparing content item embedding 118 generated by content item sub-tower 120 from content item features 122 to user embedding 124 generated by user sub-tower 126 from user features 128.

As used herein, an interaction feature such as one of interaction features 114 encompasses a value or a set of values (e.g., an embedding) that represents a strength of association between a user and one or more users, content items, or other entities associated with a content item. For example, an interaction feature can represent a strength of association between a user that may be interested in an event and another user that is already planning to attend the event. As another example, an interaction feature can represent a strength of association between a user that may be interested in an event and a company or business that is sponsoring or hosting the event.

As used herein, a fusion feature such as one of fusion features 108 encompasses a set of one or more features output by fuser 110. The set of features output by fuser 110 can include just a single feature such as initial prediction 112. In this case, fuser 110 may simply pass through initial prediction 112 as fusion features 108 where fusion features 108 encompasses just initial prediction 112. The set of features output by fuser 110 can include multiple features including initial prediction 112 and interaction feature(s)

114. In this case, fuser 110 may combine (fuse) initial prediction 112 with interaction feature(s) 114 to form the output set of features. For example, fuser 110 may concatenate initial prediction 112 with interaction feature(s) 114 in a vector or other set of values.

As used herein, initial prediction 112 encompasses a value or a set of values (e.g., a probability distribution) representing a likelihood that a user represented by user embedding 124 is interested in a content item represented by content item embedding 118. For example, initial prediction 112 may be a measure of similarity between user embedding 124 and content item embedding 118 or a measure of distance in a latent space between user embedding 124 and content item embedding 118. As described in greater detail herein, initial prediction 112 may be combined with interaction feature(s) 114 to improve the relevance and accuracy of content item recommendations and candidate invitee recommendations.

In some embodiments, an interaction feature, such as one of the interaction features 114, is derived from a knowledge graph. The knowledge graph is constructed using "entities" found in a web-based professional or social network. This knowledge graph contains data, such as graph-structured data, that represents entities and their relationships based on a domain-specific ontology.

For instance, the knowledge graph could encompass a graph-based organization of diverse entities and their relationships within a professional network. The nodes of the knowledge graph could represent entities such as users, companies, and jobs. The links (edges) in the knowledge graph could represent various relationships, including connections such as "friend," "mentor," or other relationship types, employment history, educational background, skills, credentials, and more.

The knowledge graph can also capture interconnections, such as user-user interactions. For example, messages, recommendations, endorsements, or group memberships could be represented by links between nodes representing users in the graph. Additionally, company-user relationships, such as employment history or job applications, could be represented by links between nodes representing companies and users. Similarly, job-user relationships, including job applications, interviews, and offers, could be represented by links between nodes representing jobs and users. Moreover, skill-user relationships, such as proficiencies in specific skills, endorsements, or recommendations, could be represented by links between nodes representing users and skills in the graph.

In certain embodiments, an interaction feature between a given pair of users indicates the likelihood of establishing a bi-directional first-degree connection in a social or professional network. This interaction feature is derived for the specific user pair using a link prediction approach applied to data that represents a knowledge graph containing user representations.

The link prediction approach can utilize various methodologies, including unsupervised approaches such as computing similarity measures based on entity attributes, random walks, or matrix factorization. It can also involve supervised approaches based on graphical models or deep machine learning. Additionally, topology-based methods, such as common neighbors, Jaccard measure, Adamic-Adar measure, Katz measure, and others, can be employed. Node attribute-based methods, such as Euclidean distance or Cosine similarity, may also be utilized. Furthermore, hybrid approaches that combine attribute and topology-based techniques, such as graph embeddings, probability relationship models, probabilistic soft logic, Markov logic networks, or R-Model, are also applicable.

Now, turning back to the extended two-tower network approach, consider an example. Imagine a user of the application software system 100 who utilizes the system to create an upcoming online event, such as a webinar, scheduled in a few weeks. During the event creation process, the user provides event details to the system, including the event name, description, and date/time. Subsequently, the system aims to recommend one or more users of the system to the event creator, encouraging them to attend the event. The extended two-tower network 102 can be employed to determine suitable users to recommend to the event creator based on their high probability of being interested in the event and thus likely to accept an invitation from the event creator.

Continuing with another example within the realm of online events, the provider of the application software system 100 may seek to identify events to recommend to users within their personalized content item feeds. The extended two-tower network 102 can be employed to determine upcoming events that are likely to be of interest to a particular user and recommend them within their personalized content item feed.

In a broader sense, the extended two-tower network 102 can be utilized to generate candidate invitee recommendations and content item recommendations as needed. Such a need may arise within the application software system 100 when making recommendations of content items to users and enabling users to invite others within the system to take actions on those content items.

The actions that can be triggered may vary depending on the type of content item involved. For instance, the extended two-tower network 102 can be employed within the application software system 100 to recommend content items to users and allow them to extend invitations in various forms. These invitations can include, but are not limited to, invitations to attend events, invitations to apply for job opportunities, invitations to join groups, teams, or communities, invitations to follow users or groups within personalized social network feeds, invitations to sign-up or register with the application software system, invitations to participate in beta testing of software, invitations for file or document sharing (e.g., view, edit, or download), and any other appropriate types of invitations.

Therefore, while the principles of the disclosed techniques are illustrated using examples related to events and event candidate invitee recommendations, it is important to note that the techniques are not limited to those specific types of recommendations. The techniques can be implemented in the context of various recommendation types within the application software system 100, where content items are recommended to users, and users are provided the ability to invite others within the system to take actions on specific content items.

Moving back to the top of FIG. 1, the fusion sub-model 106 generates an output prediction 104 for a "target" user and a "target" content item. This output prediction represents the probability that the target user is interested in the target content item. For instance, if the target user is a member of a web-based social network and the target content item is a web-based event hosted by the social network, the output prediction 104 may indicate the probability of the target user attending the event. Similarly, if the target content item is a digital document within a web-based content management system, the output prediction 104 may represent the likelihood of the target user being interested in the document. Likewise, if the target user is a job seeker and the target content item is an open job position posted on a web-based job board, the output prediction 104 may signify the probability of the target user applying for the position. Furthermore, if the target content item is a digital media item, such as a movie, TV show, song, or podcast, the output prediction 104 may indicate the likelihood of the target user enjoying the content. As yet another example, if the target content item is an event, then the output prediction 104 may represent the likelihood of the target user being interested in attending the event. Likewise, if the target user is a candidate invitee to an event, then the output prediction 104 may represent the likelihood of the target user accepting an invitation to attend the event.

The output prediction 104 can represent the target user's interest in the target content item through different approaches. It can include a probability score ranging from zero (0) to one (1), indicating the likelihood of the target user's interest. A score of zero (0) represents the lowest probability, while a score of 1 represents the highest probability. This probability score can be generated using an activation function within the fusion model 106, such as a sigmoid or softmax function.

The output prediction 104 can also be expressed as a binary or Boolean value by applying a threshold to the probability score. A value of 0/false signifies that the target user is not interested in the target content item, while a value of 1/true indicates the target user's interest. Additionally, the output prediction 104 can encompass a probability distribution across multiple classes. These classes may correspond to qualitative degrees of interest, such as "not interested," "slightly interested," "moderately interested," "very interested," and "extremely interested." For instance, when the target content item is a web-based event, the qualitative classes could be "very unlikely to attend," "unlikely to attend," "may attend," "likely to attend," and "very likely to attend." Each class can be assigned a probability score between zero (0) and one (1), where the sum of the probability scores across all classes equals one (1). The predicted class is typically the one with the highest probability score.

Furthermore, the output prediction 104 can include a confidence interval or probability range associated with the probability score. This interval or range estimates the uncertainty or variability in the predicted probability score.

Irrespective of its format, the output prediction 104 can be utilized by a recommendation system designed to make content item recommendations or candidate invitee recommendations.

In the case of a content item recommendation, the output prediction 104 can be employed by the recommendation system to determine whether the target content item should be recommended to the target user. For instance, the recommendation system can acquire multiple output predictions 104 from the extended two-tower network 102 for various content items. It can then rank the content items based on their output predictions 104 and recommend one or more (e.g., top-N) of the highest-ranked content items to the target user.

When it comes to user recommendations, the output prediction 104 can be utilized by the recommendation system to determine whether the target user should be recommended to another user who is associated with the target content item and may find the target user interested in the content. For instance, the user recommendation may suggest to the associated user to invite the target user to engage with the target content item. The associated user can be someone who is involved with or has a connection to the target content item within the application software system.

The associated user may take on various roles such as a creator, owner, or administrator of the target content item within the application software system. For example, they may be responsible for the management or administration of the content item and have the authority to invite others to participate or engage with it. In addition to the creator of a content item, a user that is already invited to the content item can also invite users to the content item. For example, in the context of a social network that facilitates events, the creator of an event can invite users in their network to attend the event and a user other than the creator that is attending the invite can also invite users in their network to attend the event. The techniques disclosed herein can be used to make candidate invitee recommendations to both types of users.

Moreover, the associated user can also be a user who is linked to the target content item in other ways determined by the capabilities of the application software system and the nature of the content item.

For example, the application software system may associate the related user with the target content item because they have utilized the system to accept an invitation related to the content item. This could include accepting an invitation to attend an event or accessing the content item shared by another user. The association can also be established if the related user has read or viewed the content item, liked or reacted to it, commented on it, shared it with other users, rated or reviewed it, downloaded it, interacted with it, subscribed to or followed it, or engaged in any other form of interaction with the content item. The specific interactions may vary depending on the content item and the functionality provided by the application software system.

The extended two-tower network 102 comprises a specific machine learning model architecture where the content item sub-tower 120 and user sub-tower 126 are extended by the fusion sub-model 106, which combines the outputs of the content item sub-tower and user sub-tower to generate the output prediction 104. This architecture offers several advantages.

The output predictions 104 produced by the extended two-tower network 102 can be utilized for both content item recommendations when interaction features 114 are unavailable and candidate invitee recommendations when interaction features 114 are available. For instance, when recommending who to invite to a content item, the strength of association between the user and a potential invitee plays a significant role. It is more likely that a user will accept an invitation from someone they know compared to a stranger. The extended two-tower network 102 incorporates interaction features 114 into the output predictions 104 to support more relevant user recommendations. This support is achieved because the output predictions 104 incorporating interaction features 114 considers not only the affinity (strength of association) between the target content item and the target user but also the affinity between the target user and the user to whom the user recommendation is being provided.

Within the architecture, the extended two-tower network 102 consists of two key high-level layers: the fusion layer 130 and the tower layer 132. The fusion layer 130 can be seen as an extension of the tower layer 132 to form the complete extended two-tower network 102. By incorporating interaction features 114 for candidate invitee recommendations in the fusion layer 130, the content item sub-tower 120 and the user sub-tower 126 in the tower layer 132 can generate content item embeddings 118 and user embeddings 124, respectively, even without the use of interaction features 114.

More specifically, the architecture of the extended two-tower network 102 allows for the generation of output predictions 104 for content item recommendations using the content item embeddings 118 and user embeddings 124 generated by the tower layer 132, without the need for interaction features 114. Simultaneously, the architecture enables the generation of output predictions 104 for candidate invitee recommendations using the content item embeddings 118 and user embeddings 124 produced by the tower layer 132, along with the incorporation of interaction features 114 in the fusion layer 130. This design enables the extended two-tower network 102 to handle both content item recommendations and candidate invitee recommendations effectively by leveraging the respective embeddings and incorporating interaction features in an appropriate manner.

The architecture of the extended two-tower network 102 also supports the pre-generation of content item embeddings 118 and user embeddings 124 for both content item recommendation and candidate invitee recommendation use cases. This means that embeddings 118 and 124 can be generated by the tower layer 132 before the recommendation system receives a recommendation request. The pre-generated embeddings 118 and 124 can be stored in a database or an index, allowing the recommendation system to retrieve them when a recommendation request is received. For instance, the pre-generated embeddings can be stored in an approximate nearest neighbor (ANN) index structure, which is designed to efficiently search for nearest neighbors in high-dimensional spaces.

By pre-generating the embeddings 118 and 124, the recommendation system can respond to recommendation requests more quickly, with lower latency, compared to generating the embeddings 118 or 124 in response to the request. Generating the embeddings 118 or 124 using the content item sub-tower 120 or user sub-tower 126, respectively, may require more processing cycles (e.g., CPU or GPU cycles) than retrieving the pre-generated embeddings 118 or 124 from a database or index. Pre-generating the embeddings 118 or 124 also enhances the concurrency and throughput of the recommendation system, as it can handle a higher number of recommendation requests simultaneously compared to generating the embeddings 118 or 124 on-the-fly in response to each request.

The architecture of the extended two-tower network 102 is designed to generalize across both content item recommendation and candidate invitee recommendation use cases. This generalization is achieved by including the initial prediction 112 as a feature in the fusion features 108, rather than solely relying on the content item embedding 118 and user embedding 124 in the fusion features 108. It should be noted that while the fusion features 108 can include both the content item embedding 118 and user embedding 124 along with the initial prediction 112, they can also include the initial prediction 112 in place of the content item embedding 118 and user embedding 124 within the fusion features 108.

Initial prediction 112 is produced by comparator 116. Comparator 116 compares content item embedding 118 and user embedding 124. For example, comparator 116 may compare content item embedding 118 and user embedding 124 according to an embedding comparison method. The comparison method can be based on any of: dot product, cosine similarity, Euclidean distance, Manhattan distance, Minkowski distance, or other suitable embedding comparison method. As herein, an "embedding" generally refers to a numerical representation (e.g., a dense vector representation) that captures semantic and contextual information about the thing the embedding represents in a continuous vector space. Content item embedding 118 comprises a numerical representation that captures semantic and contextual information about a respective content item in a continuous vector space. User embedding 124 comprises a numerical representation that captures semantic and contextual information about a respective user in a continuous vector space.

In some embodiments, content item embedding 118 and user embedding 124 have a same dimensionality, forcing them to be in the same latent space. Through joint training of extended two tower network 102 (see FIG. 5 and associated description below) and this same dimensionality, the higher initial prediction 112 is for a target user and a target content item, the closer in distance content item embedding 118 for the target content item and user embedding 124 for the target user are to each other in the latent space. And the lower initial prediction 112 is, the farther apart in distance content item embedding 118 for the target content item and user embedding 124 for the target user are to each other in the latent space. This relationship between the initial prediction 112 and the distance in the latent space allows for a meaningful representation of the similarity or relevance between the target user and the target content item based on their respective embeddings.

The fusion sub-model 106 is typically an artificial deep neural network. An artificial deep neural network, also known as a deep learning network or deep neural network, consists of multiple hidden layers positioned between the input and output layers.

In certain embodiments, the fusion sub-model 106 can be implemented as a multi-layer perceptron, a feedforward neural network, or a fully connected neural network. For instance, the fusion sub-model 106 may include an input layer with neurons corresponding to each feature in the fusion features 108.

A neuron within a neural network is a computational unit that receives one or more input signals, processes them, and produces an output signal. The input signals can originate from input features or other neurons within the neural network, depending on the specific layer in which the neuron resides. Each neuron typically includes a weight associated with each input signal, which is a numerical value determining the impact of that input signal on the neuron's output. During the training of the neural network, these weights are adjusted to optimize the network's performance.

Neurons also employ an activation function, which is applied to the weighted sum of the input signals to introduce non-linearity into the neuron's computations. The activation function determines the output value or activation level of the neuron based on this weighted sum. Additionally, a neuron may incorporate a bias term, which is added to the weighted sum before passing it through the activation function. The bias term helps adjust the overall output of the neuron, providing flexibility and enabling the neural network to learn more complex patterns.

The interconnection of multiple neurons across different layers of the neural network allows the network to learn intricate representations and perform computations on input data. The weights and biases associated with the neurons are adjusted during the training process, typically using techniques like backpropagation. These adjustments enable the neural network to learn from labeled examples, making predictions or classifications on new, unseen data.

The neurons in the input layer of the fusion sub-model 106 receive the fusion features 108 and pass them to the subsequent layer of the fusion sub-model 106. In cases where interaction features 114 are not included in the fusion features 108, the corresponding neurons in the input layer may receive a zero input or another suitable value. The hidden layers of the fusion sub-model 106 are responsible for capturing and learning complex patterns from the fusion features 108.

In certain embodiments, each neuron in the hidden layers of the fusion sub-model 106 is fully connected to all neurons in the previous and subsequent layers. For example, a first hidden layer of fusion sub-model 106 may have N neurons (H1,1, H1,2, H1,3, . . . H1,N). Each neuron calculates the weighted sum of the outputs from the input layer, applies an activation function (such as sigmoid or ReLU) to introduce non-linearity, and passes the output as input to all neurons in the next layer. Similar to the first hidden layer, a second hidden layer of fusion sub-model 106 can have N neurons (H2,1, H2,2, H2,3, . . . H2, N, where each neuron receives the outputs from the previous hidden layer, performs a weighted sum, applies an activation function, and passes the output to the next layer.

The output layer of the fusion sub-model 106 is responsible for generating the output prediction 104 based on the learned representations from the hidden layers. It can consist of a single neuron that calculates the weighted sum of the outputs from the last hidden layer, applies a non-linear activation function (such as the sigmoid function) to map the value to the range [0, 1], and the resulting value represents the output prediction 104. Alternatively, the output layer may include multiple neurons, with each neuron corresponding to a class label in a set of class labels representing a probability distribution. The outputs from the previous layer are fed into the softmax layer, where the softmax function is applied to each neuron's input separately. The resulting values represent the predicted probability for each class. The output prediction 104 reflects the predicted probability for the most probable class.

The fusion sub-model 106 is utilized in the extended two tower network 102 to combine the content item sub-tower 120, user sub-tower 126, and interaction feature(s) 114, merging the initial prediction 112 with the interaction feature(s) 114 to generate the output prediction 104.

As previously mentioned, the fusion sub-model 106 can be implemented as a fully connected neural network to take advantage of its capability to learn complex relationships and capture interactions among the content item features 122, user features 128, and interaction feature(s) 114 represented by the fusion features 108. The fully connected fusion sub-model 106 allows for non-linear fusion of the initial prediction 112 and interaction feature(s) 114 as represented by the fusion features 108. By employing a fully connected architecture, the fusion sub-model 106 captures intricate interactions and dependencies between the content item features 122, user features 128, and interaction feature(s) 114 within the fusion features 108, enhancing the extended two tower network's 102 ability to learn more expressive representations of the fusion features 108.

Through the connection of the initial prediction 112 and interaction feature(s) 114 via the fusion features 108 within the fully connected fusion sub-model 106, different input features 122, 128, and 114 can be effectively combined and weighted during the training process. The fusion sub-model 106 learns to assign importance to various input features 122, 128, and 114, facilitating the accurate fusion of information from the content item sub-tower 120, user sub-tower 126, and interaction feature(s) 114. Moreover, the fully connected fusion sub-model 106 learns to generalize well to unseen inputs by capturing and modeling the relationships among the features 122, 128, and 114 represented by the fusion features 108. Consequently, the extended two tower network 102 can make precise output predictions 104 for inputs that were not encountered during the training phase.

As used herein, a "feature" as in a feature of any of fusion features 108, interaction feature(s) 114, content item features 122, and user features 128 may be data that represents an individual or measurable property or characteristics of an input data point. A feature can be an embedding, for example. A feature may be used in extended two tower network 102 to represent input data in a quantitative or qualitative form that can be processed by machine learning algorithms. A feature may serve as a representation of input data, transforming raw or unstructured data into a numerical or categorical form or in a continuous vector space that can be processed by machine learning algorithms. A feature may be designed to capture the relevant information or patterns in input data that are relevant to the machine learning task at hand. A feature may be the result of feature engineering that involves the process of selecting, creating, or transforming features to enhance the performance of extended two tower network 102. A feature may also be the output of another machine learning model. A feature may be the result of a feature extraction technique (e.g., principal component analysis (PCA) or deep learning-based feature extraction using convolutional neural networks (CNNs)) used to automatically derive relevant features from raw data. A feature may be the result of a feature selection process that involves identifying and selecting the most important features from a larger set of available features. A feature may be the result of a feature scaling process in which the feature is normalized, standardized, or scaled to a common range.

The fusion features 108 are generated by the fuser 110. In situations where interaction feature(s) 114 are present for the target user and target content item, such as in a candidate invitee recommendation request, the fuser 110 combines the initial prediction 112 with the interaction feature(s) 114 to generate the fusion features 108. This can be achieved by concatenating the initial prediction 112 and the interaction feature(s) 114 into a feature vector, forming the fusion features 108 as a vector that includes both the initial prediction 112 and the interaction feature(s) 114.

Conversely, when interaction feature(s) 114 are not available for the target user and target content item, such as in a content item recommendation request, the fuser 110 generates the fusion features 108 by including the initial prediction 112 in a feature vector. In this case, one element of the feature vector corresponds to the initial prediction 112, while the remaining elements of the feature vector are set to zero or some other suitable value that represents the absence of interaction feature(s) 114. This ensures that the fusion features 108 still incorporate the initial prediction 112 even without the presence of interaction feature(s) 114.

Fuser 110 can generate fusion features 108 in different ways depending on the embodiment. While in some cases fusion features 108 are generated by concatenating the initial prediction 112 and interaction feature(s) 114, in other cases, fuser 110 combines them in alternative ways. In one approach, the initial prediction 112 is treated as a single-element vector, while the interaction feature(s) 114 is considered as a vector with one or more elements. Fuser 110 can generate fusion features 108 by performing element-wise addition or subtraction between the initial prediction 112 and the interaction feature(s) 114. This captures the interactions or disparities between the two. Alternatively, fusion features 108 can be generated by element-wise multiplication of the initial prediction 112 and the interaction feature(s) 114, capturing interactions or dependencies between them.

Another approach employed by fuser 110 is to combine the initial prediction 112 and interaction feature(s) 114 using learnable weights. In this case, the initial prediction 112 and the interaction feature(s) 114 are multiplied by the learned weights, and the weighted values are either concatenated or summed together to form the fusion features 108. During the training of the extended two tower network 102, these weights are optimized, allowing the network to determine the importance of each contribution (initial prediction 112 and interaction feature(s) 114) to the output prediction 104.

Furthermore, fuser 110 can generate fusion features 108 using an attention mechanism. This mechanism dynamically weighs the interaction feature(s) 114 based on the initial prediction 112. During training, the attention mechanism learns to assign different weights to each interaction feature of interaction feature(s) 114, focusing more on relevant or informative information. During inference, fuser 110 combines the initial prediction 112 with the weighted interaction feature(s) 114 using the dynamically assigned weights by the attention mechanism, often through concatenation.

The initial prediction 112 represents the probability that the target user is interested in the target content item and is expressed as a probability score ranging from 0 to 1. This score reflects the likelihood of the target user's interest in the target content item. As previously mentioned, the comparator 116 generates the initial prediction 112 by comparing the content item embedding 118 and the user embedding 124. This comparison can be done using various methods, such as applying a sigmoid function to the dot product of the embeddings, measuring the cosine distance between the embeddings, calculating the Euclidean distance between the embeddings, or employing other suitable similarity measures for embeddings. The higher the similarity measure indicates that the content item embedding 118 and user embedding 124 are similar, the higher the probability score of the initial prediction 112. Conversely, the lower similarity measure indicates that the content item embedding 118 and user embedding 124 are dissimilar, resulting in a lower probability score for the initial prediction 112.

Interaction feature(s) 114 encompasses one or more interaction features. Each interaction feature may represent a degree of affinity (a strength of association) between the target user and an aspect of the target content item such as, for example, a user related to the target content item (e.g., a user attending an event) or other entity related to the target content item (e.g., a company hosting the event). The related entity is an entity related to the target content item in some way. For example, where the target content item is an online event, the related entity may be the creator of the online event or an inviter to the online event or one of the target user's first-degree connections in a social network that is indicating an intent to attend the online event, etc. The inclusion of interaction feature(s) 114 may improve the relevance of candidate invitee recommendations that are based on output predictions 104 produced extended two tower network 102 compared to an output prediction that is not based on interaction feature(s) 114.

The inclusion of interaction feature(s) 114 enhances the relevance of and candidate invitee recommendations. These features capture significant signals that exist between the related entity and the target user, indicating their potential connection as invitees to the content item. Specifically, the strength of affinity between the related entity and the target user plays a crucial role in determining the likelihood of the target user accepting an invitation to the content item. When there is a strong affinity between the target user and the related entity, the probability of the target user accepting the invitation increases. On the other hand, when the affinity between the related entity and the target user is weaker, the likelihood of the target user accepting the invitation decreases.

In some embodiments, interaction feature(s) 114 encompasses an "inviter" interaction feature. The inviter interaction feature represents a degree of affinity (a strength of association) between (a) a related user related to the target content item and (b) the target user for which a determination of whether to make a candidate invitee recommendation of the target user to the related user is to be made. Each such candidate invitee recommendation may be a recommendation to the related user to invite a respective target user to the target content item. For a given candidate invitee recommendation, the inviter interaction feature represents a degree of affinity (a strength of association) between the related user and the respective target user.

In some embodiments, the inviter interaction feature represents an estimate of the likelihood that the related user and the target user would be mutual first-degree connections in a social or professional network, irrespective of whether they currently are or are not mutual first-degree connections. The inviter interaction feature can be determined in several ways including by any or all of: common neighbors, structural measures, similarity metrics, collaborative filtering, machine learning models, influence propagation, or other suitable approach or technique for estimating the likelihood of mutual first-degree connection between two users.

With common neighbors, the number of common connections that the related user and the target user share in the social or professional network is determined. Where the two users have more common connections, then the inviter interaction feature may indicate that the two users are more likely to be mutual first-degree connections. Conversely, where the two users have fewer common connections, then the inviter interaction feature may indicate that the two users are less likely to be mutual first-degree connections.

With structural measures, various social or professional network measure may be utilized to estimate the likelihood of mutual first-degree connection including any or all of: the degree centrality (number of connections of a user), betweenness centrality (importance of a user as a bridge between others), and closeness centrality (how easily a user can reach others). Users with similar or complementary structural measures may have a higher probability of being mutual first-degree connections.

With similarity metrics, the similarity between users based on their attributes or behavior is analyzed. For example, features such as interests, location, education, work experience, and past interaction patterns may be used to compute a similarity score. Users with higher similarity scores may be considered more likely to be mutual first-degree connections.

With collaborative filtering, historical data on user connections and behaviors is leveraged to predict future connections. By analyzing patterns and similarities in user behavior, such as similar likes, comments, or groups joined, the algorithm can estimate the likelihood of connection between two users.

Machine learning models, such as logistic regression, decision trees, or graph-based models, can be trained on historical data to estimate the likelihood of connections. These models can consider a combination of network features, user attributes, and interaction patterns to estimate the probability of connection.

With influence propagation, models simulate the spreading of influence or information through a social or professional network. By considering the propagation dynamics and the users' influence potential, it is possible to estimate the likelihood of connection between users.

The accuracy and suitability of these methods may vary depending on the available data, the context of the social or professional network, and the specific characteristics of the users and their interactions. Combining multiple approaches or employing more sophisticated techniques, such as deep learning or graph neural networks, may further enhance the prediction accuracy.

Inviter interaction features can be pre-computed for pairs of users on a periodic basis (e.g., once a day, once a week, or at any other suitable frequency). As such, the inviter interaction feature for a given related user and a given target user can be pre-computed prior to a candidate invitee recommendation request as opposed to computing the inviter interaction feature in response to the candidate invitee recommendation request, which may be computationally prohibitive for acceptable request processing latency and for scaling the recommendation system to many concurrent users. Instead, given a candidate invitee recommendation request, the recommendation system can simply lookup the pre-computed inviter interaction feature for the related user and the target user from a database, an index, or the like using identifiers of the related user and the target user as keys or query or lookup parameters.

In some embodiments, interaction feature(s) 114 encompasses a "common connections" interaction feature. The common connections interaction feature represents a number of users related to the target user that are also related to the target content item. For example, the common connections interaction feature for an online event may be a number of the target user's mutual first-degree connections in a social or professional network that have indicated their intent to attend the online event. The greater the number of common connections, the greater the degree of affinity between the target user and the related users that are related to the target content item. The lower the number of common connections, the lower the degree of affinity between the target user and the related users that are related to the target content item.

Note that the set of related users related to the target content item that are included in the common connections count for the target user may be determined differently depending on the type of content item. In the online event example given, a user is included in the set of related users that are counted only if the user both: (1) has a mutual first-degree connection with the target user in the social or professional network, and (2) has indicated they will be attending the online event (e.g., by accepting an invitation to the event). In other words, the target user may be more likely to accept an invitation to attend the online event the greater the number of the target user's mutual first-degree connections that are attending the event. As another example involving a target document or file content item, a user may be included in the set of related users if the user both: (1) is sharing at least one other document or file content item with the target user, and (2) is sharing the target document or file content item with one or more users other than the target user. In other words, the target user may be more likely to accept an invitation to share the target document or file content item the greater the number of users that are sharing content items with the target user that are also sharing the target content item with other users.

These are just two examples of the ways the common connections interaction feature can be determined. The common connections interaction feature can be determined in various different ways depending on the type of content item. In general, however, the common connections interaction feature represents a number of users that are related to both the target user and the target content item in some way.

Common connections interaction feature can be pre-computed for pairs of target users and target content items on a periodic basis (e.g., once an hour, once a day, once a week, or other suitable frequency). As such, the common connections interaction feature for the target user and the target content item can be pre-computed prior to a candidate invitee recommendation request as opposed to computing the common connections interaction feature in response to the candidate invitee recommendation request, which may be computationally prohibitive for acceptable request processing latency and for scaling the recommendation system to many concurrent users. Instead, given a candidate invitee recommendation request, the recommendation system can simply lookup the pre-computed common connections interaction feature for the target user and the target content item from a database, an index, or the like using identifiers of the target user and the target content item as keys or query or lookup parameters.

It should be noted that the common connections interaction feature for the target user and the target content item can change over time as more users become related to the target content item. For example, a candidate invitee recommendation of the target user as a potential invitee to an online event may not be made a first time when none of the target user's mutual first-degree connections are attending the online event. Later, after some of the target user's mutual first-degree connections indicate their intent to attend the online event, the common connection interaction feature for the target user and the online event will increase accordingly making it more likely than the first time that the target user is recommended as a potential invitee in a subsequent candidate invitee recommendation based on the increased common connection interaction feature.

Content item sub-tower 120 and user sub-tower 126 make up a two tower neural network. Each of content item sub-tower 120 and user sub-tower 126 process different inputs. Content item sub-tower 120 and user sub-tower 126 may operate independently to produce their respective embeddings 118 and 124 from their respective inputs 122 and 128 but are connected in fusion layer 130 for producing output prediction 104.

In some embodiments, each of content item sub-tower 120 and user sub-tower 126 encompass a deep neural network. For example, sub-tower 120 or 126 can be a multi-layer perceptron or a feedforward neural network. However, unlike fusion sub-model 106, sub-tower 120 and sub-tower 126 may have a funnel architecture.

In the funnel architecture, the number of neurons or layers may progressively decrease through the initial and intermediate hidden layers, reach a minimum in the bottleneck layer, and then may increase again through the expanding hidden layers towards the output layer. The funnel architecture may help the neural network capture increasingly abstract and high-level features while reducing computational complexity and dimensionality. For example, sub-tower 120 or sub-tower 126 may encompass an input layer, one or more initial hidden layers, one or more intermediate hidden layers, the bottleneck hidden layer, and an output layer.

The input layer may receive the input features (e.g., content item features 122 or user features 128), which may be a vector or a matrix representation of the input features. The initial hidden layers of the neural network may perform linear transformations followed by non-linear activations, such as the rectified linear unit (ReLU) or sigmoid activation function. These layers may aim to capture low-level features and patterns from the input data.

After each initial hidden layer, subsequent hidden layers may be gradually introduced with a reduced number of neurons compared to the previous layer. The number of neurons or layers may be progressively decreased in a funnel-like manner, narrowing down the network's representation. Each intermediate hidden layer may perform a linear transformation followed by a non-linear activation function.

The bottleneck hidden layer may be the narrowest part of the funnel architecture, where the number of neurons or layers may be significantly reduced compared to the intermediate layers. The bottleneck hidden layer may aim to capture the most essential and informative features from the input data. The bottleneck layer may perform a linear transformation followed by a non-linear activation function.

The final layer of the sub-tower may produce the embedding (e.g., content item embedding 118 or user embedding 124, which is a compact and informative representation of the input features.

The output layer may use a linear transformation or any other suitable operation to generate the embedding.

Content item features 122 represent a target content item. No particular set of content item features 122 are required, and content item features 122 may vary depending on the type of application software system making recommendations, the type of the target content item, and the data about the target content item that is available to the application software system. For example, content item features 122 may include textual features, visual features, audio features, metadata features, interaction features, or any other suitable feature or features.

For where the target content item encompasses textual content, content item features 122 may include features such as word embeddings (e.g., Word2Vec, GloVe, or BERT embeddings) to represent the semantic meaning of words or sentences in the text content of the target content item. Additionally, or alternatively, bag-of-words representations or TF-IDF (Term Frequency-Inverse Document Frequency) vectors can capture the presence and importance of specific words or n-grams in the text content. Word frequency, word counts, or word histograms can provide statistical information about the text content of the target content item.

For any visual content of the target content item, content item features 122 may include features such as convolutional neural network (CNN) activations from pre-trained models (e.g., VGG, ResNet, or Inception) that capture visual patterns and features. Color histograms, texture descriptions (e.g., Gabor filters), or edge features can also represent important visual characteristics. Object detection or semantic segmentation features can capture the presence of specific objects or regions in the visual content.

For audio content, features such as Mel-frequency cepstral coefficients (MFCCs) can represent the spectral content and timbre of the audio signal. Pitch, energy, or rhythm-based features can capture the musical or acoustic characteristics of the audio. Spectrograms or other time-frequency representations can provide a detailed representation of the audio content.

For metadata, metadata associated with the target content item, such as timestamps, geographic information, user ratings, or user tags, can provide valuable contextual information. Social network features, such as the number of likes, shares, or comments, can represent the popularity or engagement level of the content.

For interaction features, if the target content item is part of a user interaction or sequence of actions, features related to the user's behavior, session information, or historical context can be useful. Sequential patterns, timestamps, or click-through rates can capture the dynamics and temporal characteristics of the interactions.

User features 128 represent a target user. No particular set of user features 128 are required, and user features 128 may vary depending on the domain of application software system making recommendations and the data about the target user that is available to the application software system. For example, user features 128 may include user preferences, behavior features, social features, contextual features, interaction features, sequential patterns, embeddings from other networks, or any other suitable feature or features.

User preferences encompass features that represent the target user's preferences can include explicit or implicit feedback, ratings, or reviews given by the target user for content items. User preferences can also be represented by categorical variables indicating preferences for certain genres, topics, or types of content.

Behavioral features of the target user's behavior can be captured by features such as click history, search history, purchase history, or browsing patterns. Time-related features like session duration, frequency of interactions, or recency of actions can provide information about the target user's engagement and activity level with the application software system.

Social network-related features can include information about the target user's social connections, followers, or friends. Features representing the influence or popularity of the target user within a social network can also be considered.

Contextual features representing contextual information can be valuable for understanding target user behavior. This includes features such as device type, time of day, location, or weather conditions associated with the target user. Environmental factors or contextual information specific to the application or domain can provide additional insights into the target user's preferences and behavior.

Interaction features include features related to target user-content item interactions, such as the number of likes, shares, comments, or duration of interactions, can capture the level of engagement or interest in specific items.

Sequential patterns may include sequential features that represent the target user's historical sequence of actions or interactions. Features such as the order of item interactions, timestamps, or session-based patterns can provide valuable information about the target user's preferences and interests.

Embeddings generated from other networks, such as social network embeddings or item embeddings, can be used as additional features to capture the target user's relationships or preferences.

Figure 2:
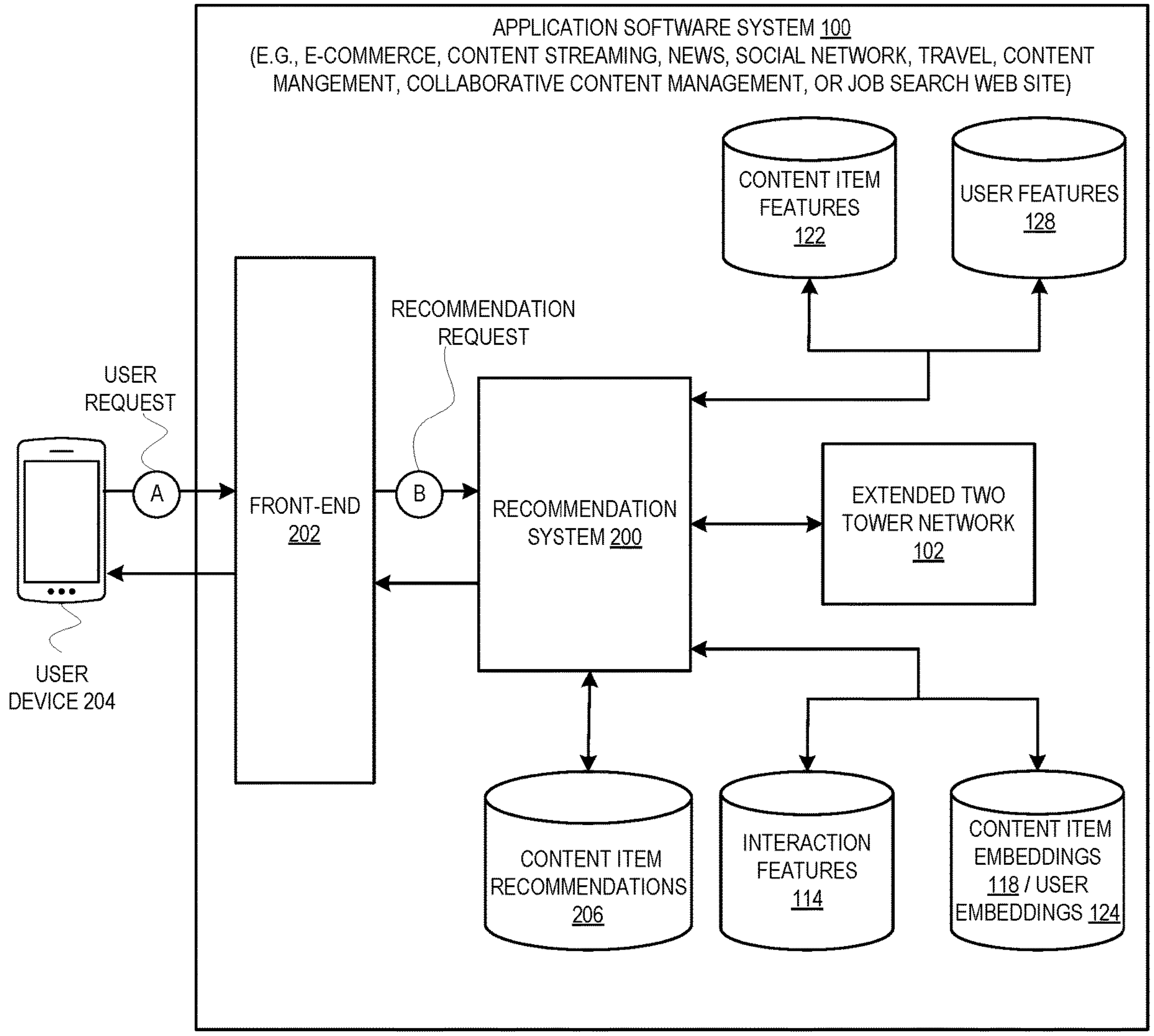
FIG. 2 illustrates operation of the application software system that uses the extended two tower network and a recommendation system to provide candidate invitee recommendations and content item recommendations to users of the application software system, according to some embodiments.

Turning now to FIG. 2, it illustrates operation of application software system 100 that uses extended two tower network 102 and recommendation system 200 to provide candidate invitee recommendations and content item recommendations to users of application software system 100, according to some embodiments. As shown, application software system 100 includes recommendation software system 200, front-end software system 202, extended two tower network 102, content item features 122, user features 128, content item recommendations 206, interaction features 114, and content item embeddings 118 and user embeddings 124. Application software system 100 may be communicatively coupled to user device 204 via one or more data communications networks (e.g., the internet).

While in some embodiments all of the functionality and capabilities of application software system 100 is implemented by one or more server computers such as one or more server computing devices housed or collocated in a data center facility, some or all of the functionality and capabilities of application software system 100 is implemented on a client computing device such as user device 204. Thus, the techniques disclosed herein are not limited to the client-server or cloud-computing arrangement shown in FIG. 2 but can be implemented by other types of computing architectures such as, for example, by an edge computing architecture where the techniques are implemented by an edge computing device or a distributed computing architecture where a portion of the techniques are implemented at the edge and a portion of the techniques are implemented in the cloud.

Various operations are depicted in FIG. 2 with lettered circles overlaying directed arrows. The direction of the arrows represents a direction of data or information flow between the connected components but not necessarily the exclusive direction. Data or information may flow between components via one or more data communications networks (e.g., an internet protocol (IP) network) and carried in requests and responses that conform to standard networking protocol (e.g., HTTP, HTTPS, TCP, IP, etc.)

At operation A, user device 204 sends a "user" request that is received at front-end 202 of application software system 100. User device 204 can be a personal computing device such as a desktop computer, a laptop computer, a tablet computer, a smartphone, or other type of personal computing device. Front-end 202 can encompass a user-facing or client-facing part of application software system 100. Font-end 202 may include functionality for handling user interactions, presenting information, and facilitating communication between user device 204 and application software system 100. Front-end 202 may include functionality for driving a user interface at client device 204. The user interface may encompass web pages, forms, buttons, menus, or other components that user of user device 204 can interface with to communicate with application software system 100. Front-end 202 may implement a presentation layer of application software system including functionality for causing the rendering and display of data to the user at user device 204. In doing so, front-end 202 may use presentation technologies such as HTML, CSS, and JAVASCRIPT. Front-end 202 may use various communication protocols to interact with client device 204 such as HTTP, WebSockets, XML-RPC, REST, or GRAPHQL.

While only one user device 204 is depicted in FIG. 2 for the purpose of providing a clear example, in a practical embodiment, application software system 100 may support multiple user devices including concurrently processing multiple user requests from multiple user devices. For example, application software system 100 may be a large-scale application software system available on the internet and concurrently used by hundreds, thousand, or millions, of users and user devices.

The user request received at front-end 202 at operation A may cause front-end 202 to send at operation B a "recommendation" request that is received by recommendation system 200. The recommendation request may be a request for a candidate invitee recommendation (candidate invitee recommendation request) or a request for a content item recommendation (content item recommendation request). Whether a content item recommendation request or a candidate invitee recommendation request is sent at operation B may depend on the user request sent at operation A.

For example, if the user request of application software system 100 is to display a personalized content item feed to the user of user device 204, then the recommendation request may be a content item recommendation request to obtain one or more content item recommendations (e.g., an online event recommendation) to include in the displayed content item feed. Likewise, if the user request of application software system 100 is to display one or more content item recommendations to the user of user device 204, then the recommendation request may be a content item recommendation request to obtain one or more content item recommendations to present to the user of user device 204. As another example, if the user request of application software system 100 is to create a new content item, then the recommendation request may be a candidate invitee recommendation request to obtain one or more candidate invitee recommendations to present to the user of user device 204 as potential invitees to the newly created content item. Similarly, if the user request of application software system 100 is to display one or more candidate invitee recommendations to the user of user device 204 as an inviter to a particular content item, then the recommendation request may be a candidate invitee recommendation request to obtaining one or more candidate invitee recommendations to present to the user of user device 204 as potential invitees to the particular content item.

If the recommendation request received by recommendation system 200 at operation B is a content item recommendation request, then a target user may be specified in or indicated by the content item recommendation request. The target user in this case is a user for which one or more content item recommendations are to be made. For example, the target user can the user of user device 204 who is requesting to view their personalized content item feed to be presented at user device 204 or otherwise requesting to receive content item recommendations to be presented at user device 204.

If the recommendation request received by recommendation system 200 at operation B is a candidate invitee recommendation request, then a target content item may be specified in or indicated by the candidate invitee recommendation request. The target content item is a content item for which one or more candidate invitee recommendations are to be made. For example, the target content item can be a content item for which one or more candidate invitee recommendations of one or more users to invite to the content item are to be presented to the user of user device 204 as potential invitees. For example, the user of user device 204 can be a user that created the target content item or a user that is already invited to the target content item.

In the case of a content item recommendation request, content item recommendations 206 for the target user may be pre-generated (e.g., generated prior to recommendation system 200 receiving the content item recommendation request). Pre-generated content item recommendations 206 for the target user may be generated using extended two tower network 102. For example, pre-generated content item recommendations 206 for the target user may be generated on a regular interval (e.g., once a day) using the latest available content item features 122, user features 128, content item embeddings 118, or and user embeddings 124.

Recommendation system 200 may invoke extended two tower network 102 to generate output predictions 104 for the target user and a set of one or more target content items. Each output prediction 104 is for one target user, target content item pair where the target user is the same for each pair and the target content item in each pair is different. Based on the output predictions 104, recommendation system 200 may order (sort) the set of target content items according to relevance to the target user.

For example, the set of target content items may be ordered (sorted) in order of their respective output predictions 104. Alternatively, the respective output predictions 104 may be used as an input to a ranking algorithm that orders (sorts) the set of target content items based on the respective output predictions 104 and one or more additional inputs. The resulting ordered (sorted) set of target content items may be stored in a database or index associated with the target user as part of pre-generated content item recommendations 206.

When the content item recommendation request for the target user is received by recommendation system 200 at operation B, recommendation system 200 can retrieve identifiers of one or more of the highest ordered target content items associated with the target user in content item recommendations 206 and return indications of them to front-end 202 for return to user device 204 as content item recommendations.

While content item recommendations for a target user can be pre-generated as content item recommendation 206, pre-generation of content item recommendations is not a requirement. For example, in response to a content item recommendation request received by recommendation system 200 for a target user, recommendation system 200 may retrieve content item features 122 for a target content item and retrieve user features 128 for the target user from a database or index.

Recommendation system 200 may then provide the retrieved features to extended two tower network 102 as input which processes the inputs starting at tower layer 132 and produces output prediction 104 for the target user and the target content item as a result. Recommendation system 200 can then determine whether to recommend the target content item based on output prediction 104. As an alternative, in response to a content item recommendation request received by recommendation system 200 for a target user, recommendation system 200 may retrieve pre-generated content item embedding 118 for a target content item and pre-generated user embedding 124 for the target user from a database or index. Recommendation system 200 may then provide the retrieved embeddings to extended two tower network 102 as input which processes the inputs starting at fusion layer 130 (skipping tower layer 132 since the embeddings have already been generated) and produces output prediction 104 for the target user and the target content item as a result. Recommendation system 200 can then determine whether to recommend the target content item based on output prediction 104.

In the case of a candidate invitee recommendation request for a target content item, the user of user device 204 may already be associated with the target content item in some way. For example, the user of user device 204 may be the creator of the target content item or a user that has already accepted an invitation to the target content item (e.g., accepted an invitation to attend an event or accepted an invitation to share a document or file). The candidate invitee recommendation request may be to recommend to the user of user device 214 one or more target users to invite to the target content item.

In response to receiving the candidate invitee recommendation request for the target content item, recommendation system 200 may invoke extended two tower network 102 to generate output predictions 104 for the target content item and a set of one or more target users. Each output prediction 104 is for one target user, target content item pair where the target content item is the same for each pair and the target user in each pair is different. Based on the output predictions 104, recommendation system 200 may order (sort) the set of target users according to relevance. For example, the set of target users may be ordered (sorted) in order of their respective output predictions 104.

Alternatively, the respective output predictions 104 may be used as an input to a ranking algorithm that orders (sorts) the set of target users based on the respective output predictions 104 and one or more additional inputs. When the content item recommendation request for the target user is received by recommendation system 200 at operation B, recommendation system 200 can return identifiers of one or more of the highest ordered target users to front-end 202 for return to user device 204 as candidate invitee recommendations that are recommended to the user of user device 204 as potential invitees to the target content item.

For example, in response to a candidate invitee recommendation request received by recommendation system 200 for a target content item, recommendation system 200 may retrieve content item features 122 for a target user, retrieve user features 128 for the target content item, and retrieve interaction feature(s) 114 for the target user and the target content item from one or more databases or indexes. Recommendation system 200 may then provide the retrieved features to extended two tower network 102 as input which processes the inputs starting at tower layer 132 and produces output prediction 104 for the target user and the target content item as a result. Recommendation system 200 can then determine whether to recommend the target user based on output prediction 104.

As an alternative, in response to a content item recommendation request received by recommendation system 200 for a target user, recommendation system 200 may retrieve pre-generated content item embedding 118 for the target content item, pre-generated user embedding 124 for the target user, and interaction feature(s) 114 for the target user and the target content item from one or more databases or indexes. Recommendation system 200 may then provide the retrieved embeddings and interaction feature(s) 114 to extended two tower network 102 as input which processes the inputs starting at fusion layer 130 (skipping tower layer 132 since the embeddings have already been generated) and produces output prediction 104 for the target user and the target content item as a result. Recommendation system 200 can then determine whether to recommend the target user based on output prediction 104.

Candidate invitee recommendations are useful after a new content item is created. For example, a candidate invitee recommendation to invite a particular user to a newly created content item representing an online event that will take place in the future may be useful to the creator of the content item (e.g., the event organizer) soon after the content item is created. However, in a large-scale application software system, there may be a delay between when a new content item is created and when content item features 124 about that new content item are available for use as input to extended two tower network 102. For example, a large-scale data processing pipeline (e.g., a map-reduce pipeline) may be used to transform raw data about the newly created event into content item features 124. This pipeline processing may take a few minutes or even a few hours to complete. In the meantime, some features of content item features 124 about the newly created content item may not be available.

Figure 3:
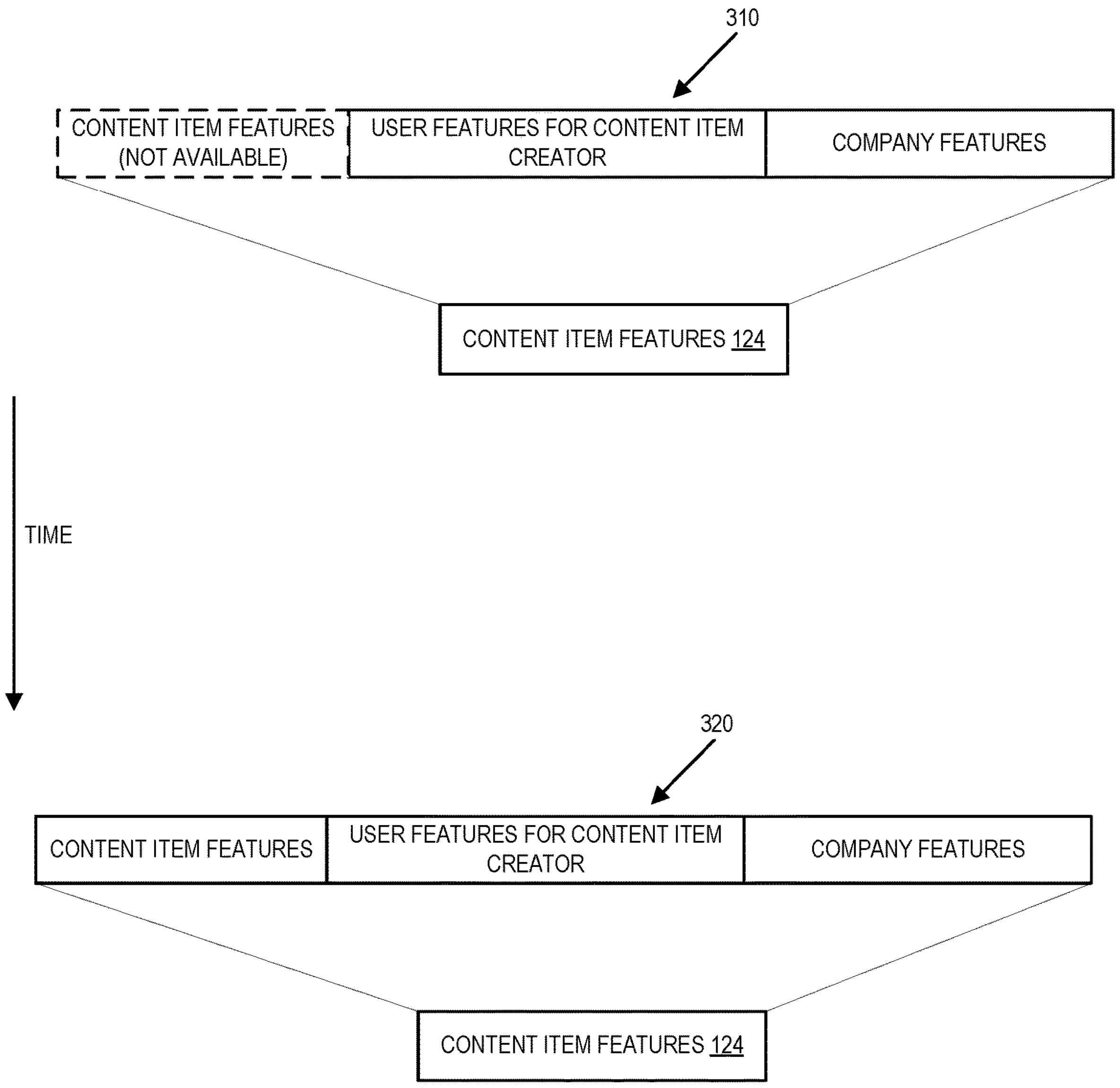
FIG. 3 illustrates an evolution of content item features for a target content item over time as features about the target content item become available, according to some embodiments.

This is illustrated by the example of FIG. 3. A first time is represented by element 310 and a later second time is represented by element 320. The first time may correspond to a time soon after a content item is created. The second time may correspond to a later time after a large-scale data processing pipeline has processed raw data about the new content item. At the first time, content item features 124 about the new content item that are available include features about the creator of the content item and features about a company or a business associated with the content item but features about the new content item itself are not yet available.

At the later second time, however, the content item features 124 about the new content item include all of the creator features, the company features, and the event features. In this case, where there is a delay in feature availability, extended two tower network 102 can still make candidate invitee recommendations based on content item features that are missing some features that are not yet available due to a large-scale data processing pipeline delay. This can be done by setting the feature values for the not yet available features to zero or some other suitable value in content item features 124 for the target content item while the features are not available. Later, when those features are available, the feature values representing the now available features can be included in content item features 124 for the target content item. As a result, a first candidate invitee recommendation for the target content item can be made immediately or soon after the target content item is created and a second candidate invitee recommendation for the target content item can be made after the second time after more content item features are available. Because of the missing features, the first candidate invitee recommendation may not be as accurate (relevant) as the second candidate invitee recommendation. Nonetheless, a candidate invitee recommendation can be provided to the creator of a content item immediately or soon after the content item is created.

Figure 4:
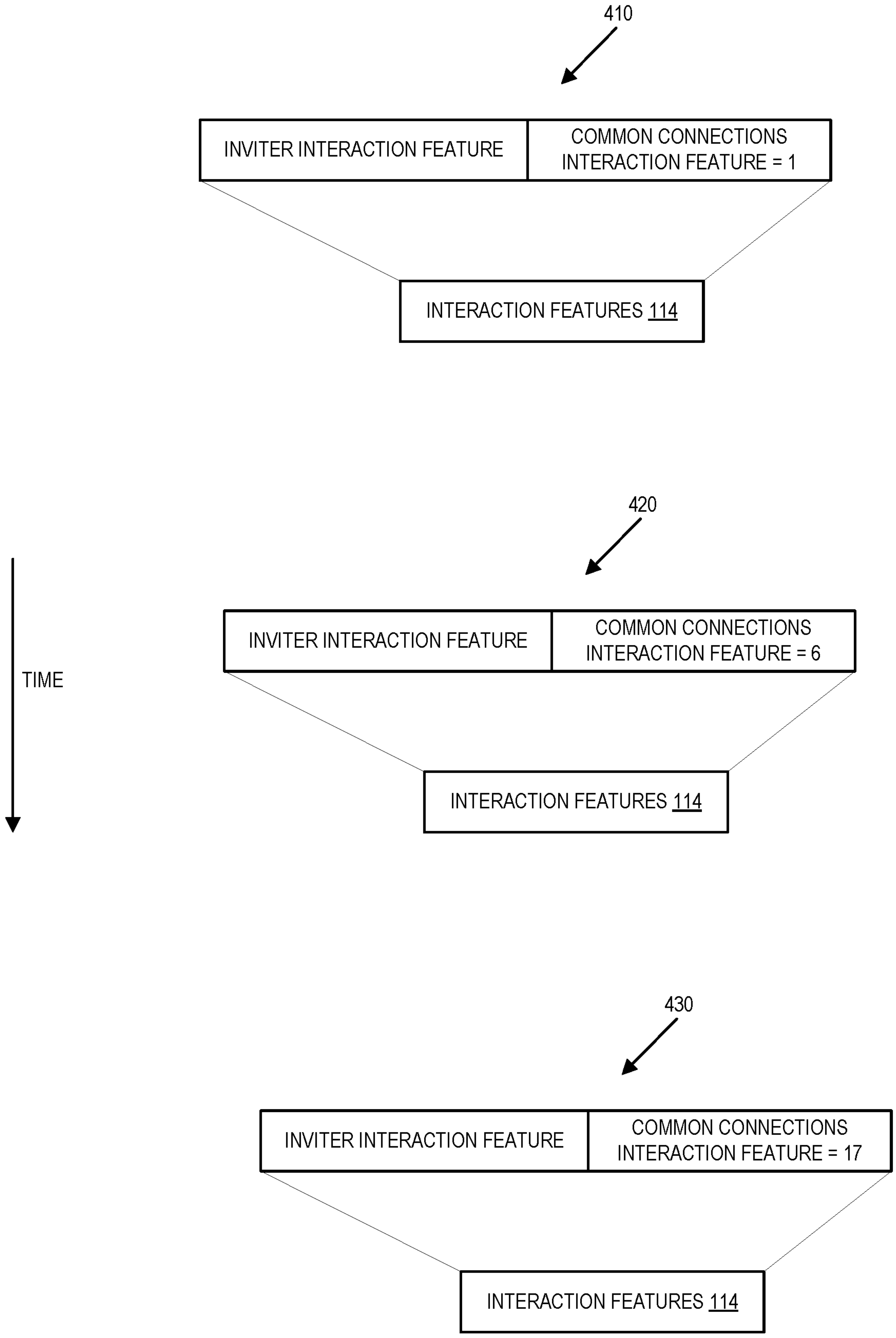
FIG. 4 illustrates an evolution of interaction features over time as interactions with a target content item occur, according to some embodiments.

FIG. 4 illustrates evolution of interaction features 114 for a target content item and a target user over time as interactions with the target content item occur, according to some embodiments. Element 410 represents interaction features 114 for the target content item and the target user at a first time. Element 420 represents interaction features 114 for the target content item and the target user at a later second time after the first time. Element 430 represents interaction features 114 for the target content item and the target user at a later third time that is after the second time. As shown, from the first time to the third time, the common connections interaction feature for the target user and the target content item increases as a number of users related to the target user interact with the target content item.

For example, immediately after a new content item representing an online event is created, there may be no users related to the target user that have accepted an invitation to attend the online event, or the only user related to the target user that is attending the online event may be the event creator. After the first time but before the second time, the event creator may be presented with a candidate invitee recommendation to invite one or more users that are related to the target user. If some of those users accept the invitation to attend the event, then the common connections interaction feature for the target content item and the target user will increase. For example, at the second time, the number of users related to the target user that have accepted an invitation to attend the online event has increased to six. As invitations to attend the online event continue to be sent in response to candidate invitee recommendations made after the first time or the second time, the common connections interaction feature for the target user and the target content item may continue to increase. For example, at the third time, the number of users related to the target user that have accepted an invitation to attend the online event has increased to 17.

Because of the increasing common connections interaction feature value for the target content item and the target user over time, output predictions 104 for the target content item and the target user may also increase overtime. As a result, output prediction 104 for the target content item and the target user at an earlier time may not be high enough to cause the target user to be recommended as a potential invitee but may be high enough later after the common connections interaction feature value for the target content item and the target user has increased. For example, the target user may not appear in a first set of users recommended to the event creator after the first time and before the third time but may appear in a second set of users recommended to the event creator after the third time.

Figure 5:
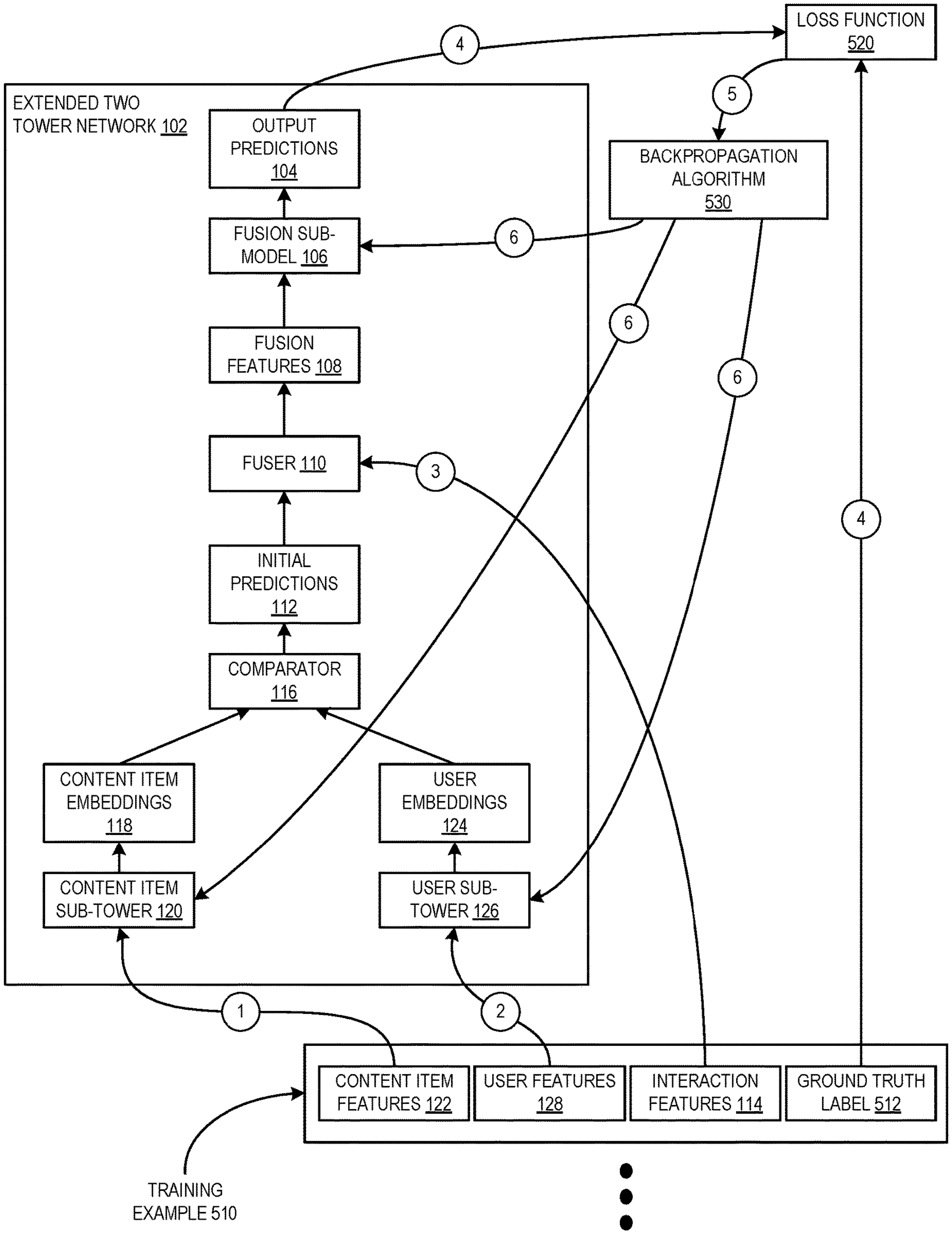
FIG. 5 illustrates joint training of an extended two tower network, according to some embodiments.

FIG. 5 illustrates joint training of extended two tower network 102, according to some embodiments. In particular, fusion sub-model 106, content item sub-tower 120, and user sub-tower 126 are jointly trained based on a set of training examples 510. Each training example 510 may include content item features 122, user features 128, and interaction features 114. Not every training example 510 in the training data set need include non-zero values for all content item features 122, all user features 128, and all interaction features 114. Some training examples 510 may have sparse features where some of content item features 122 are zero valued, some of user features 128 are zero valued, or some of interaction features 114 are zero valued.

Each training example 510 may represent a candidate invitee recommendation or a content item recommendation. In the case of a content item recommendation, interaction features 114 of the training example 510 may be zero valued. Ground truth label 512 of a training example 510 represents a corresponding candidate invitee recommendation or corresponding content item recommendation that is acted upon by a user to which the recommendation is presented. For example, if representing that the corresponding candidate invitee recommendation or the corresponding content item recommendation is acted upon, then ground truth label 512 of the corresponding training example 510 may be one (1) or other numerical value that represents a relevant recommendation. On the other hand, if representing that the corresponding candidate invitee recommendation or the corresponding content item recommend is not acted upon, then ground truth label 512 of the corresponding training example 510 may be zero (0) or other numerical value that represents an irrelevant recommendation. The training data set may contain a mix of training examples 510 that represent content item recommendations and candidate invitee recommendations.

During training of extended two tower network 102, content item features 122 of training examples 510 are input to content item sub-tower 120 (Operation 1). User features 128 of training examples 510 are input to user sub-tower 126 (Operation 2). And interaction features 114 of training examples 510 are input to fuser 110 (Operation 3). Extended two tower network 102 produces output predictions 104 during training based on the input training examples 510. The output predictions 104 are input to loss function 520 (e.g., binary cross-entropy loss) that penalizes extended two tower network 102 for making output predictions 104 that don't match ground truth labels 512 of the corresponding training examples 510 (Operation 4). Loss function 520 is minimized during training. The loss is input to backpropagation algorithm 530 which computes the gradients of the loss with respect to parameters of fusion sub-model 106, content item sub-tower 120, and user sub-tower 126 (Operation 5). The computed gradients are used to update parameters of fusion sub-model 106, content item sub-tower 120, and user sub-tower 126 using an optimization algorithm such as stochastic gradient descent (SGD) or Adam optimizer (Operation 6). The training may be repeated for multiple epochs until extended two tower network 102 converges to a set of optimal parameters for fusion sub-model 106, content item sub-tower 120, and user sub-tower 126. By optimizing extended two tower network 102 this way, extended two tower network 102 including fusion sub-model 106, content item sub-tower 120, and user sub-tower 126 learns to generate output predictions 104 that capture the underlying patterns and relationships in the training data set, and can make accurate output predictions 104 on new, unseen inputs.

Figure 6:
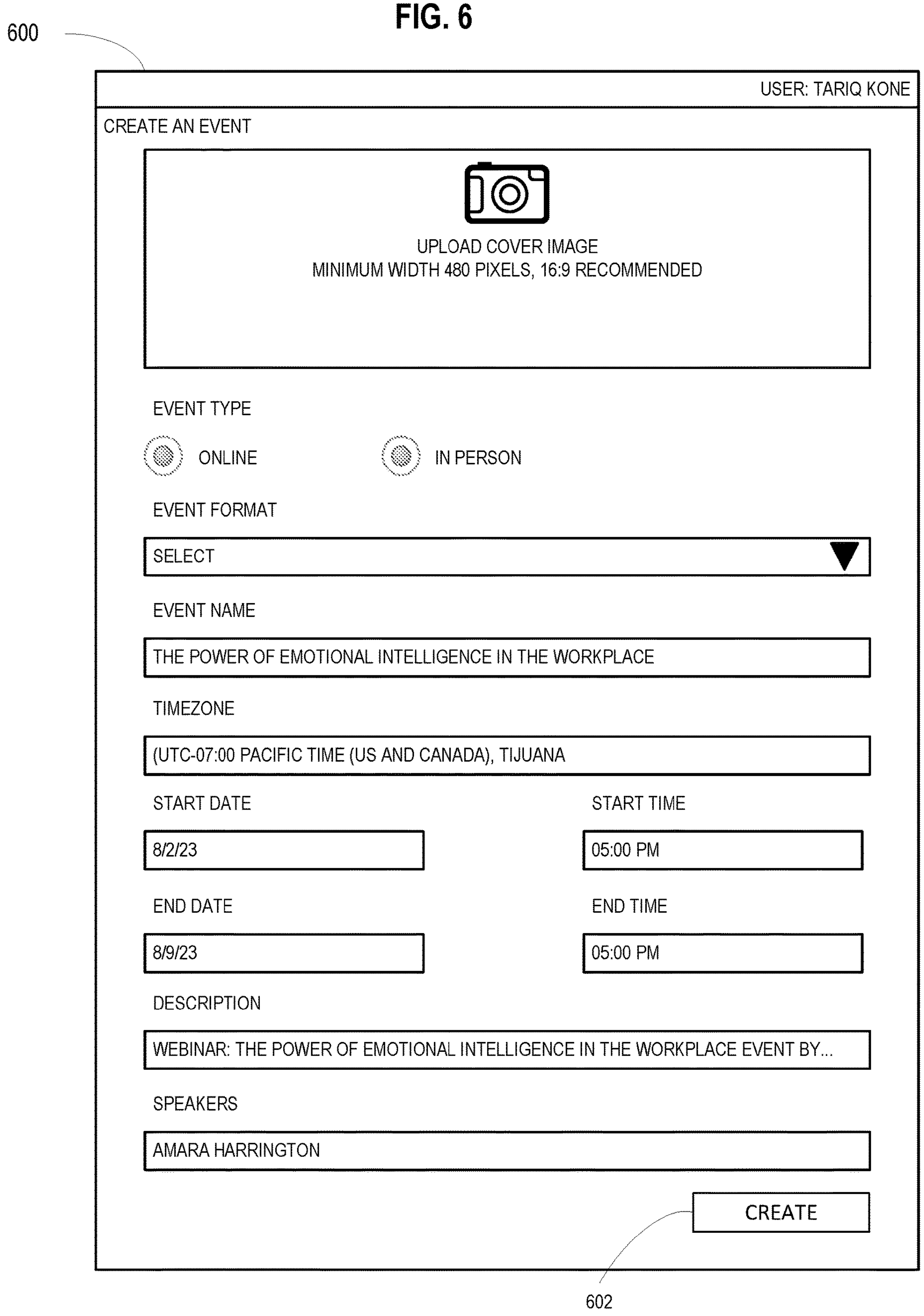
FIG. 6 is a mock-up of a graphical user interface (GUI) for creating a content item, according to some embodiments.
Figure 7:
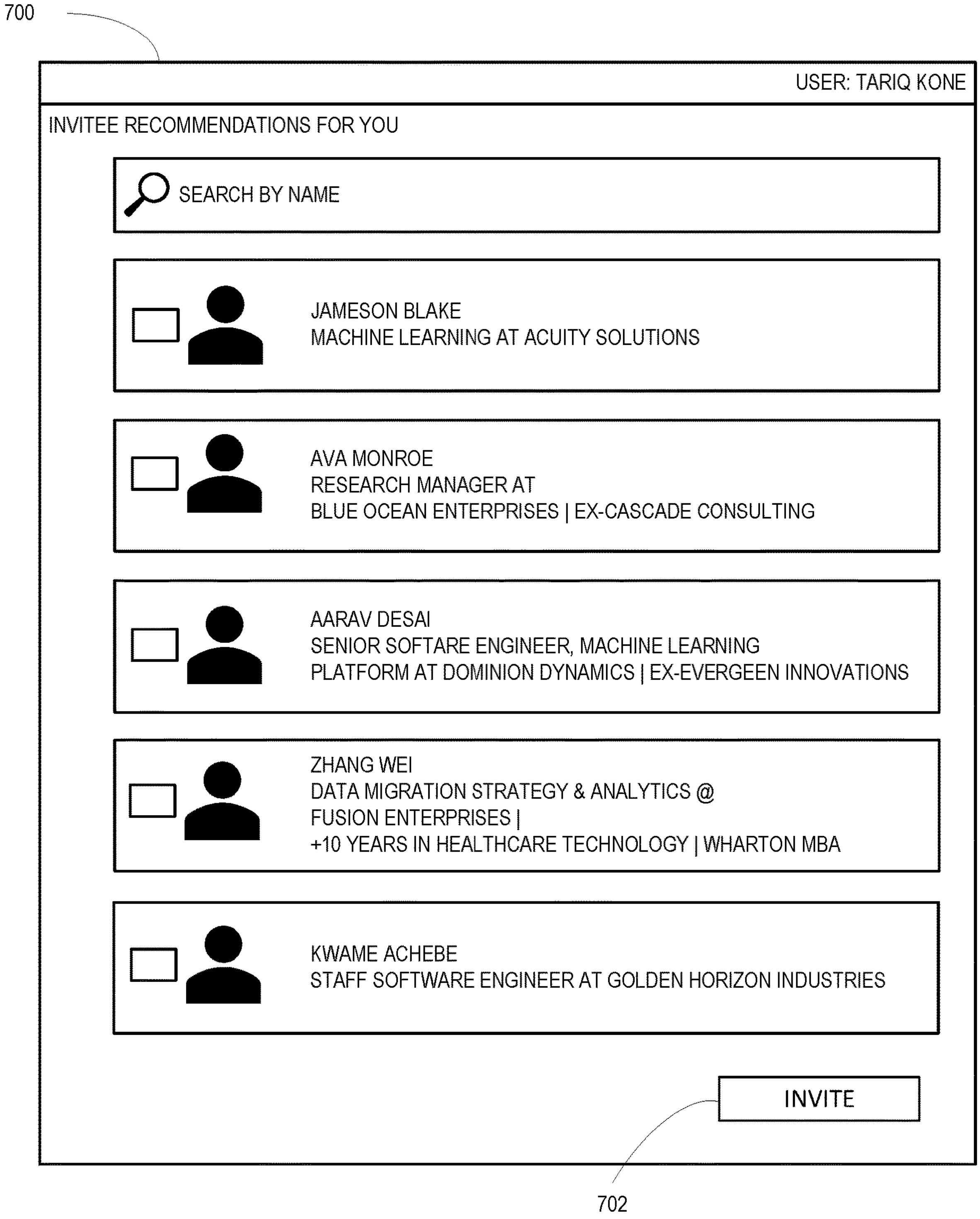
FIG. 7 is a mock-up of a graphical user interface (GUI) presenting a set of candidate invitee recommendations, according to some embodiments.

FIG. 6 is a mock-up of a graphical user interface (GUI) 600 for creating a content item, according to some embodiments. In this example, a user can provide the parameters of an event to create. FIG. 7 is a mock-up of a GUI 700 presenting a set of candidate invitee recommendations, according to some embodiments. For example, graphical user interface 700 may be presented to the user of graphical user interface 600 of FIG. 6 after the user uses GUI 600 to create a new event (e.g., in response to the activating the create button 602 of GUI 600). GUI 700 recommends several users to the event creator to invite to the newly created event. The candidate invitee recommendations of GUI 700 may be determined using extended two tower network 102 as disclosed herein. The user may select one or more of the recommended users by selecting the checkbox next to their listing in GUI 700. The user may then select the invite button 702 of GUI 700 which causes the application software system to send invitations (e.g., by email) to the selected users inviting them to attend the newly created event.

Figure 8:
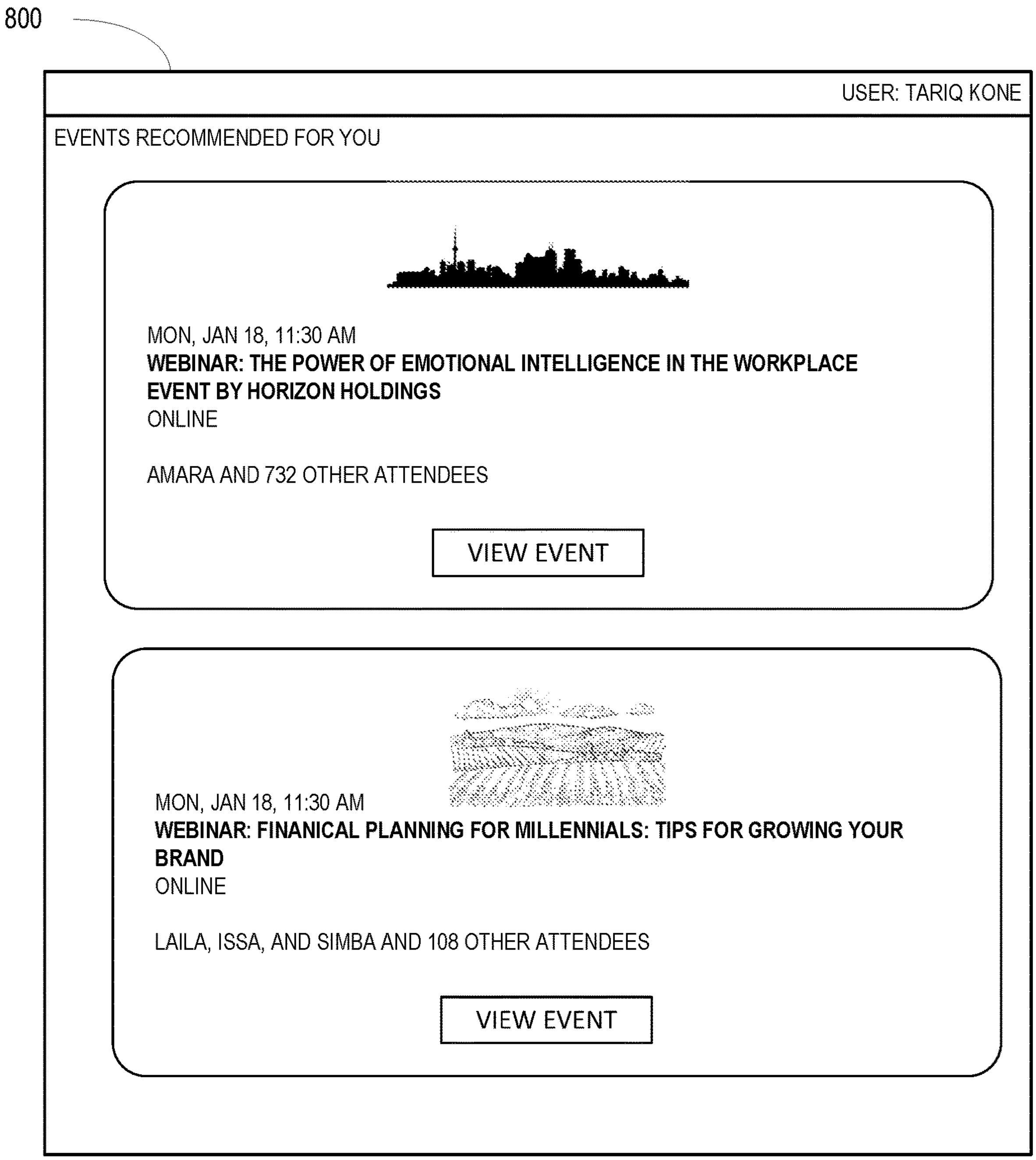
FIG. 8 is a mock-up of a graphical user interface (GUI) presenting content item recommendations, according to some embodiments.

FIG. 8 is a mock-up of a graphical user interface (GUI) 800 presenting content item recommendations, according to some embodiments. In this example, two online events are recommended to a user as personalized recommendations. The content item recommendations of GUI 800 may be determined using extended two tower network 102 as disclosed herein.

Figure 9:
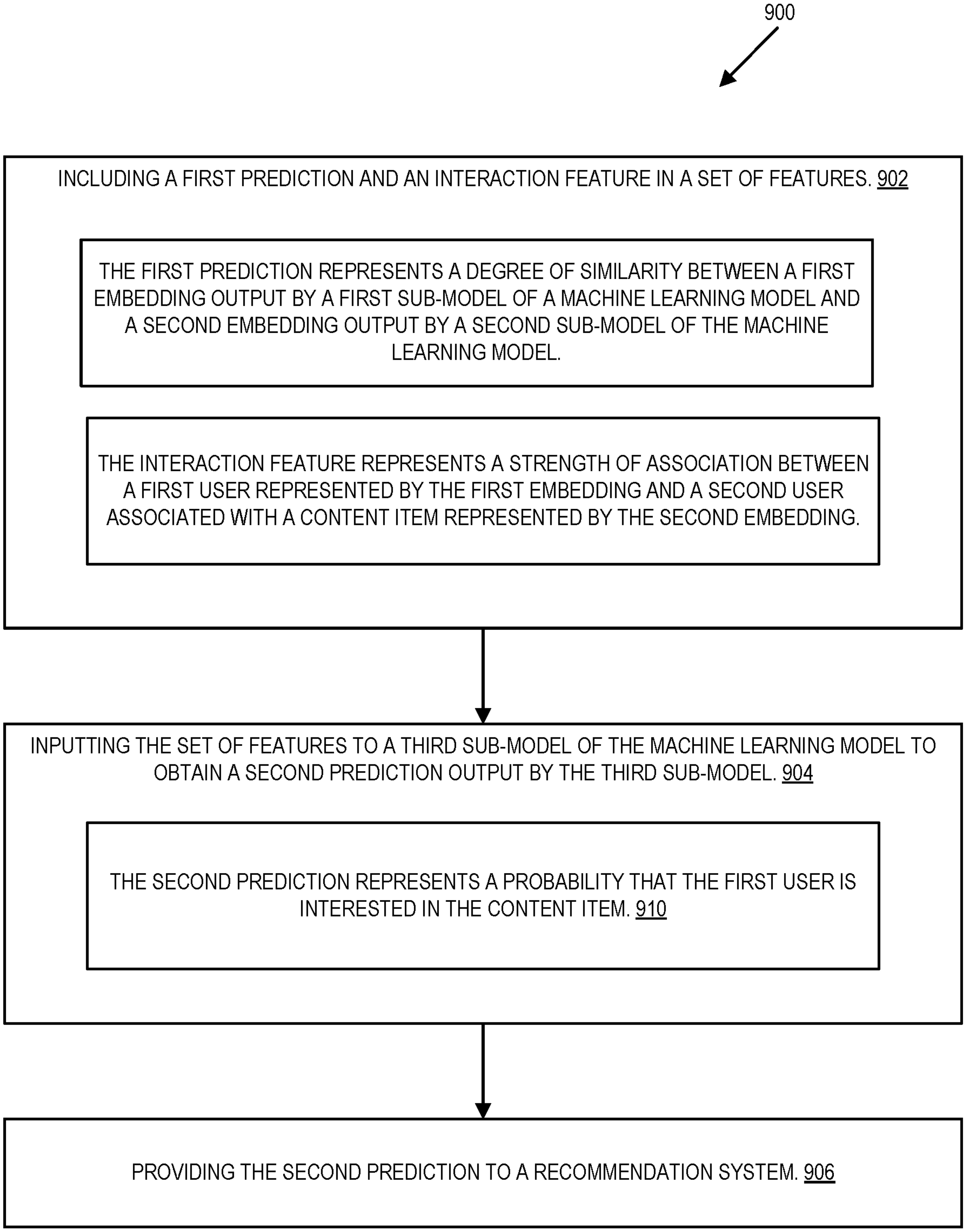
FIG. 9 is a flowchart of a method for jointly optimizing multiple different types of recommendations using an extended two tower network, according to some embodiments.

FIG. 9 is a flowchart of a method for jointly optimizing multiple different types of recommendations using an extended two tower network, according to some embodiments. The method 900 may be performed by extended two tower network 102, for example.

At operation 902 of method 900, a first prediction is included in a set of features along with an interaction feature. For example, the first prediction can be initial prediction 112 for a target user and a target content item, the interaction feature can be the inviter interaction feature of iteration feature(s) 114, and the set of features can be the set of fusion features 108 for the target user and the target content item. In some embodiments, where method 900 is performed in the context of a content item recommendation, the set of features does not include the interaction feature. Instead, the interaction feature is included in the set of features when method 900 is performed in the context of a candidate invitee recommendation.

In some embodiments, the first prediction represents a degree of similarity between a first embedding output by a first sub-model of a machine learning model and a second embedding output by a second sub-model of the machine learning model. For example, the first embedding can user embedding 124 for the target user output (generated) by user sub-tower 126 of extended two-tower network 102 and the second embedding can be content item embedding 118 for the target content item output (generated) by content item sub-tower 120 of extended two tower network 102. The first prediction may represent the degree of similarity between the first embedding and the second embedding based on comparing the first embedding and the second embedding according to an embedding similarity measure such as, for example, a sigmoid function applied to a dot product of the two embeddings, a cosine similarity between the two embeddings, or a Euclidean distance between the two embeddings.

In some embodiments, the interaction feature represents a strength of association between the target user represented by the first embedding and a "related" user associated with the target content item represented by the second embedding. For example, the related user can be the creator of the target content item or a user who has permission to invite other users to the target content item and to whom a candidate invitee recommendation is to be made as a result of method 900.

At operation 904, the set of features are input to a third sub-model of the machine learning model to obtain a second prediction output (generated) by the third sub-model. For example, the set of fusion features 108 for the target user and the target content item may be input to fusion sub-model 106 to obtain output prediction 104 output (generated) by fusion sub-model 106.

In some embodiments, the second prediction represents a probability that the target user is interested in the target content item. For example, the second prediction can be output prediction 104 for the target user and the target content item.

At operation 906, the second prediction is provided to a recommendation system. For example, the recommendation system may be recommendation system 200 above. The second prediction can be provided to the recommendation system in a variety of different ways. For example, the second prediction can be provided as a response to an application programming interface (API) call or function invocation from the recommendation system. Additionally, or alternatively, the second prediction can be provided to the recommendation system by any or all of: via a shared memory segment, via a database, via an index, in a network message (packet) sent to the recommendation system. Upon receiving the second prediction, the recommendation may determine whether to recommend the target content item or the target user depending on whether the recommendation is in response to a content item recommendation request or a candidate invitee recommendation request, respectively, received from the recommendation system. For example, the recommendation system may determine to recommend the target content item or the target user based on the second prediction because the second prediction exceeds a threshold prediction value, because a score computed based on the second prediction exceeds a threshold, or because a ranking (order) of the target content item or the target user based on the second prediction is within the top-N target content items or target users of the ranking (ordering) where N is selected according to the requirements of the particular implementation at hand, according to set of one or more heuristics, or according to a machine learning algorithm, etc.

Figure 10:
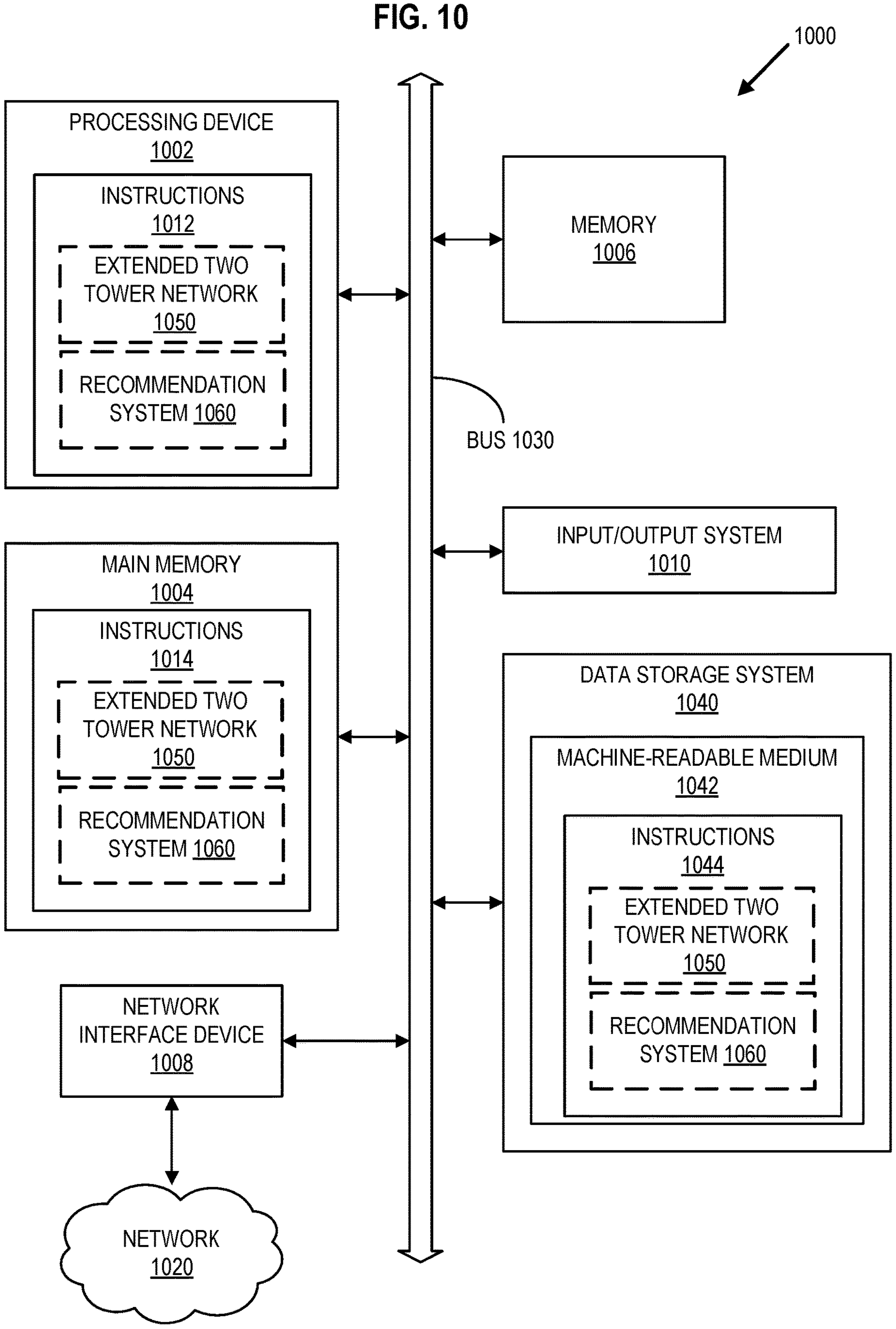
FIG. 10 is a block diagram of an example computer system including components of an extended two tower network for jointly optimizing multiple different types of recommendations, in accordance with some embodiments of the present disclosure.

FIG. 10 is a block diagram of an example computer system including components of an extended two tower network recommendation system in accordance with some embodiments of the present disclosure.

In FIG. 10, an example machine of a computer system 1000 is shown, within which a set of instructions, for causing the machine to perform any of the methodologies discussed herein, can be executed. In some embodiments, the computer system 1000 can correspond to a component of a networked computer system (e.g., as a component of application software system 100 of FIG. 1 or FIG. 2) that includes, is coupled to, or utilizes a machine to execute an operating system to perform operations corresponding to one or more components of recommendation system 200 of FIG. 2 or extended two tower network 102 of FIG. 1, FIG. 2, or FIG. 3. For example, computer system 1000 corresponds to a portion of computing system when the computing system is executing a portion of recommendation system 200 or extended two tower network 102.

The machine is connected (e.g., networked) to other machines in a local area network (LAN), an intranet, an extranet, or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a memory 1006 (e.g., flash memory, static random access memory (SRAM), etc.), an input/output system 1010, and a data storage system 1040, which communicate with each other via a bus 1030.

Processing device 1002 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be at least one special-purpose processing device such as an application specific integrated circuit (ASIC), a field programmable gate array (FPGA), a digital signal processor (DSP), network processor, or the like. The processing device 1002 is configured to execute instructions 1012 for performing the operations and steps discussed herein.

In FIG. 10, extended two tower network 1050 represents portions of extended two tower network 102 when the computer system 1000 is executing those portions of extended two tower network 102. Instructions 1012 include portions of extended two tower network 1050 when those portions of the extended two tower network 1050 are being executed by processing device 1002. Thus, extended two tower network 1050 is shown in dashed lines as part of instructions 1012 to illustrate that, at times, portions of extended two tower network 1050 are executed by processing device 1002. For example, when at least some portion of extended two tower network 1050 is embodied in instructions to cause processing device 1002 to perform the method(s) described above, some of those instructions can be read into processing device 1002 (e.g., into an internal cache or other memory) from main memory 1004 or data storage system 1040. However, it is not required that all of extended two tower network 1050 be included in instructions 1012 at the same time and portions of extended two tower network 1050 are stored in at least one other component of computer system 1000 at other times, e.g., when at least one portion of the extended two tower network 1050 are not being executed by processing device 1002.

In FIG. 10, recommendation system 1060 represents portions of recommendation system 200 when the computer system 1000 is executing those portions of recommendation system 200. Instructions 1012 include portions of recommendation system 1060 when those portions of the recommendation system 1060 are being executed by processing device 1002. Thus, recommendation system 1060 is shown in dashed lines as part of instructions 1012 to illustrate that, at times, portions of recommendation system 1060 are executed by processing device 1002. For example, when at least some portion of recommendation system 1060 is embodied in instructions to cause processing device 1002 to perform the method(s) described above, some of those instructions can be read into processing device 1002 (e.g., into an internal cache or other memory) from main memory 1004 or data storage system 1040. However, it is not required that all of recommendation system 1060 be included in instructions 1012 at the same time and portions of recommendation system 1060 are stored in at least one other component of computer system 1000 at other times, e.g., when at least one portion of recommendation system 1060 are not being executed by processing device 1002.

The computer system 1000 further includes a network interface device 1008 to communicate over the network 1020. Network interface device 1008 provides a two-way data communication coupling to a network. For example, network interface device 1008 can be an integrated-services digital network (ISDN) card, cable modem, satellite modem, or a modem to provide a data communication connection to a corresponding type of telephone line. As another example, network interface device 1008 can be a local area network (LAN) card to provide a data communication connection to a compatible LAN. Wireless links can also be implemented. In any such implementation network interface device 1008 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 1000.

Computer system 1000 can send messages and receive data, including program code, through the network(s) and network interface device 1008. In the Internet example, a server can transmit a requested code for an application program through the Internet and network interface device 1008. The received code can be executed by processing device 1002 as it is received, or stored in data storage system 1040, or other non-volatile storage for later execution.

The input/output system 1010 includes an output device, such as a display, for example a liquid crystal display (LCD) or a touchscreen display, for displaying information to a computer user, or a speaker, a haptic device, or another form of output device. The input/output system 1010 can include an input device, for example, alphanumeric keys and other keys configured for communicating information and command selections to processing device 1002. An input device can, alternatively or in addition, include a cursor control, such as a mouse, a trackball, or cursor direction keys for communicating direction information and command selections to processing device 1002 and for controlling cursor movement on a display. An input device can, alternatively or in addition, include a microphone, a sensor, or an array of sensors, for communicating sensed information to processing device 1002. Sensed information can include voice commands, audio signals, geographic location information, or digital imagery, for example.

The data storage system 1040 includes a machine-readable storage medium 1042 (also known as a computer-readable medium) on which is stored at least one set of instructions 1044 or software embodying any of the methodologies or functions described herein. The instructions 1044 can also reside, completely or at least partially, within the main memory 1004 or within the processing device 1002 during execution thereof by the computer system 1000, the main memory 1004 and the processing device 1002 also constituting machine-readable storage media.

In one embodiment, the instructions 1044 include instructions to implement functionality corresponding to the extended two tower network recommendation system (e.g., extended two tower network 102 of FIG. 1 and FIG. 2 and recommendation system of FIG. 2).

Dashed lines are used in FIG. 10 to indicate that it is not required that the extended two tower network recommendation system be embodied entirely in instructions 1012, 1014, and 1044 at the same time. In one example, portions of the extended two tower network recommendation system are embodied in instructions 1044, which are read into main memory 1004 as instructions 1014, and portions of instructions 1014 are read into processing device 1002 as instructions 1012 for execution. In another example, some portions of the extended two tower network recommendation system are embodied in instructions 1044 while other portions are embodied in instructions 1014 and still other portions are embodied in instructions 1012.

While the machine-readable storage medium 1042 is shown in an example embodiment to be a single medium, the term "machine-readable storage medium" should be taken to include a single medium or multiple media that store the at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 10 and the accompanying description, above, are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 1000, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

As used herein and in the appended claims, unless otherwise clear in context, the terms "comprising," "having," "containing," "including," or other similar terms are intended to be equivalent in meaning and be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular relationship. For example, unless otherwise clear in context, a "first device" could be termed a "second device."

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment.

As used herein, unless otherwise clear in context, the term "or" is open-ended and encompasses all possible combinations, except where infeasible. For example, if it is stated that a component may include A or B, then, unless infeasible or otherwise clear in context, the component may include at least A, or at least B, or at least A and B. As a second example, if it is stated that a component may include A, B, or C then, unless infeasible or otherwise clear in context, the component may include at least A, or at least B, or at least C, or at least A and B, or at least A and C, or at least B and C, or at least A and B and C.

Unless the context clearly indicates otherwise, conjunctive language in this description and in the appended claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

Unless the context clearly indicates otherwise, the relational term "based on" is used in this description and in the appended claims in an open-ended fashion to describe a logical or causal connection or association between two stated things where one of the things is the basis for or informs the other without requiring or foreclosing additional unstated things that affect the logical or casual connection or association between the two stated things.

Unless the context clearly indicates otherwise, the relational term "in response to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
- receiving a first embedding output by a first sub-model of a machine learning model, wherein the first embedding is of an invitee user of an application software system;
- receiving a second embedding output by a second sub-model of the machine learning model, wherein the second embedding is of an event associated with an inviter user of the application software system;
- creating a first prediction comprising a degree of similarity between the first embedding and the second embedding;
- deriving an interaction feature by applying a link prediction operation to a knowledge graph, wherein the interaction feature represents a likelihood of the inviter user and the invitee user having a connection;
- creating a set of features comprising the first prediction and the interaction feature;
- inputting the set of features to a third sub-model of the machine learning model;
- receiving a second prediction, the second prediction output by the third sub-model, wherein the second prediction represents a likelihood that the invitee user is interested in the event; and
- providing the second prediction to a recommendation system, wherein the recommendation system uses the second prediction to determine whether to send a recommendation to the inviter user via the application software system.

2. The method of claim 1, wherein the first sub-model, the second sub-model, and the third sub-model are jointly trained.

3. The method of claim 1, wherein the inviter user associated with the event is a creator of the event.

4. The method of claim 1, wherein the interaction feature is a first interaction feature; and wherein creating the set of features comprises:
- including a second interaction feature in the set of features; wherein the second interaction feature represents a number of users associated with the invitee user that are also associated with the event.

5. The method of claim 1, wherein:
- the set of features is a first set of features;
- the second embedding representing the event is generated by the second sub-model based on a first set of content item features representing the event;
- the method further comprises:
  - after a second set of content items features representing the event are available:
  - creating a second set of features comprising a third prediction and the interaction feature; wherein the third prediction represents a degree of similarity between the first embedding and a third embedding generated by the second sub-model of the machine learning model based on the second set of content items representing the event;
  - inputting the second set of features to the third sub-model to obtain a fourth prediction output by the third sub-model; wherein the fourth prediction represents a likelihood that the invitee user is interested in the event; and
  - providing the fourth prediction to the recommendation system.

6. The method of claim 1, wherein the first prediction comprises a dot product of the first embedding and the second embedding.

7. The method of claim 1, wherein including the first prediction and the interaction feature in the set of features is based on concatenating the first prediction and the interaction feature to form a set of fusion features; and wherein the set of features comprises the set of fusion features.

8. The method of claim 1, wherein:

the event is an online event hosted by an online social network;

the invitee user is a member of the online social network;

the inviter user associated with the event is a member of the online social network and has indicated to the online social network an intent to attend the online event; and the recommendation system recommends to the inviter user associated with the event to invite the invitee user to attend the online event.

9. The method of claim 1, wherein:

the inviter user associated with the event has access to the event in a content management system; and the recommendation system recommends to the inviter user associated with the event to share the event with the invitee user.

10. The method of claim 1, wherein the first embedding is generated by the first sub-model prior to receiving a request to create the event.

11. The method of claim 1, wherein the creating the set of features, inputting the set of features to the third sub-model, receiving the second prediction output by the third sub-model, and providing the second prediction to the recommendation system are performed in response to the recommendation system receiving a request to make a candidate invitee recommendation to the inviter user associated with the event; and wherein the first embedding is generated by the first sub-model prior to the recommendation system receiving the request.

12. A system comprising:

a set of one or more processors; and memory coupled to the set of one or more processors; and wherein the memory comprises instructions which, when executed by the set of one or more processors, cause the system to perform operations comprising:

receiving a first embedding output by a first sub-model of a machine learning model, wherein the first embedding is of an invitee user of an application software system;

receiving a second embedding output by a second sub-model of the machine learning model, wherein the second embedding is of an event associated with an inviter user of the application software system;

creating a first prediction comprising a degree of similarity between the first embedding and the second embedding;

deriving an interaction feature by applying a link prediction operation to a knowledge graph, wherein the interaction feature represents a likelihood of the inviter user and the invitee user having a connection;

creating a set of features comprising the first prediction and the interaction feature;

inputting the set of features to a third sub-model of the machine learning model;

receiving a second prediction, the second prediction output by the third sub-model, wherein the second prediction represents a likelihood that the invitee user is interested in the event; and providing the second prediction to a recommendation system, wherein the recommendation system uses the second prediction to determine whether to send a recommendation to the inviter user via the application software system.

13. The system of claim 12, wherein the first sub-model, the second sub-model, and the third sub-model are jointly trained.

14. The system of claim 12, wherein the inviter user associated with the event is a creator of the event.

15. The system of claim 12, wherein the interaction feature is a first interaction feature; and wherein the memory further comprises instructions which, when executed by a set of one or more processors of the system, cause the system to perform operations comprising:

including a second interaction feature in the set of features; wherein the second interaction feature represents a number of users associated with the invitee user that are also associated with the event.

16. The system of claim 12, wherein:

the set of features is a first set of features;

the second embedding is a first content item embedding;

the first content item embedding is generated by the second sub-model based on a first set of content item features representing the event;

wherein the memory further comprises instructions which, when executed by a set of one or more processors of the system, cause the system to perform operations comprising:

after a second set of content item features representing the event are available:

including a third prediction and the interaction feature in a second set of features; wherein the third prediction represents a degree of similarity between the user embedding and a second content item embedding generated by the content item sub tower second sub-model based on the second set of content item features representing the event;

inputting the second set of features to the third sub-model to obtain a fourth prediction output by the third sub-model; wherein the fourth prediction represents a likelihood that the invitee user is interested in the event; and providing the fourth prediction to a recommendation system.

17. A non-transitory machine-readable storage medium storing instructions which, when executed by a set of one or more processors of a computer system, cause the computer system to perform operations comprising:

receiving a first embedding output by a first sub-model of a machine learning model, wherein the first embedding is of an invitee user of an application software system;

receiving a second embedding output by a second sub-model of the machine learning model, wherein the second embedding is of an event associated with an inviter user of the application software system;

creating a first prediction comprising a degree of similarity between the first embedding and the second embedding;

deriving an interaction feature by applying a link prediction operation to a knowledge graph, wherein the interaction feature represents a likelihood of the inviter user and the invitee user having a connection;

creating a set of features comprising the first prediction and the interaction feature;

inputting the set of features to a third sub-model of the machine learning model;

receiving a second prediction, the second prediction output by the third sub-model, wherein the second prediction represents a likelihood that the invitee user is interested in the event; and;

providing the second prediction to a recommendation system, wherein the recommendation system uses the second prediction to determine whether to send a recommendation to the inviter user via the application software system.

18. The non-transitory machine-readable storage medium of claim 17, wherein the first sub-model, the second sub-model, and the third sub-model are jointly trained.

19. The non-transitory machine-readable storage medium of claim 17, wherein the inviter user associated with the event is a creator of the event.

20. The non-transitory machine-readable storage medium of claim 17, further storing instructions which, when executed by a set of one or more processors of the computer system, cause the computer system to perform operations comprising:

including a common connections interaction feature in the set of features; wherein the common connections interaction feature represents a number of users associated with the invitee user that are also associated with the event.

* * * * *